US011948433B2

(12) United States Patent
Chan

(10) Patent No.: US 11,948,433 B2

(45) **Date of Patent: *Apr. 2, 2024**

(54) MANAGING COMPUTER-IMPLEMENTED GAME ECONOMIES

(71) Applicant: Zynga Inc., San Francisco, CA (US)

(72) Inventor: Kin Hang Chan, Chicago, IL (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,307

(22) Filed: May 27, 2022

(65) Prior Publication Data

US 2022/0292928 A1 Sep. 15, 2022

Related U.S. Application Data

(63) Continuation of application No. 17/501,017, filed on Oct. 14, 2021, which is a continuation of application No. 16/823,279, filed on Mar. 18, 2020, now Pat. No. 11,183,022.

(51) Int. Cl.
*G07F 17/32* (2006.01)

(52) U.S. Cl.
CPC ...... *G07F 17/3267* (2013.01); *G07F 17/3248* (2013.01); *G07F 17/3258* (2013.01); *G07F 17/3276* (2013.01); *G07F 17/3281* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 4,856,788 | A | 8/1989 | Fischel |
| 8,360,873 | B1 | 1/2013 | Wickett et al. |
| 9,352,217 | B1 | 5/2016 | Curtis et al. |
| 10,181,127 | B2 | 1/2019 | Osvald et al. |
| 10,482,486 | B2 | 11/2019 | Osvald et al. |
| 10,632,386 | B1 | 4/2020 | Curtis et al. |
| 11,183,022 | B2 | 11/2021 | Chan |
| 11,869,313 | B2 | 1/2024 | Chan |
| 2010/0227691 | A1 | 9/2010 | Karsten |

(Continued)

OTHER PUBLICATIONS

"U.S. Appl. No. 16/823,279, Non Final Office Action dated Apr. 7, 2021", 7 pgs.

(Continued)

*Primary Examiner* — Ronald Laneau

(74) *Attorney, Agent, or Firm* — Schwegman Lundburg & Woessner, P.A.

(57) ABSTRACT

A game server is configured to implement a multiplayer online computer-implemented game that provides an inflationary economy system which allows for growth in a player's in-game virtual currency with an increase in game level or experience, while attenuating the in-game purchasing power by concomitantly inflating virtual currency value of predefined inflationary features. The inflationary features include rewards or winnings available by the player pursuant to gameplay success. Players at different inflationary levels can compete in-game for a common reward or jackpot, but a virtual currency value of the reward is denominated differently at different inflation levels.

20 Claims, 20 Drawing Sheets

(56) References Cited

U.S. PATENT DOCUMENTS

| | | | | |
|---|---|---|---|---|
| 2012/0129590 | A1* | 5/2012 | Morrisroe | A63F 13/332 463/25 |
| 2015/0209667 | A1* | 7/2015 | Burgin | A63F 13/493 463/43 |
| 2016/0314654 | A1 | 10/2016 | Lo | |
| 2021/0295655 | A1* | 9/2021 | Hang Chan | G07F 17/3276 |
| 2022/0215721 | A1 | 7/2022 | Chan | |

OTHER PUBLICATIONS

"U.S. Appl. No. 16/823,279, Notice of Allowance dated Jul. 7, 2021", 6 pgs.
"U.S. Appl. No. 16/823,279, Response filed May 27, 2021 to Non Final Office Action dated Apr. 7, 2021", 9 pgs.
"U.S. Appl. No. 17/501,017, Preliminary Amendment filed Mar. 29, 2022", 9 pgs.
U.S. Appl. No. 16/823,279, U.S. Pat. No. 11,183,022, filed Mar. 18, 2020, Managing Computer-Implemented Game Economies.
U.S. Appl. No. 17/501,017, filed Oct. 14, 2021, Managing Computer-Implemented Game Economies.
"U.S. Appl. No. 17/501,017, Non Final Office Action dated Mar. 27, 2023", 7 pgs.
"U.S. Appl. No. 17/501,017, Response filed Mar. 28, 2023 to Non Final Office Action dated Mar. 27, 2023", 9 pgs.
"U.S. Appl. No. 17/501,017, Final Office Action dated Apr. 10, 2023", 7 pgs.
"U.S. Appl. No. 17/501,017, Response filed Aug. 10, 2023 to Final Office Action dated Apr. 10, 2023", 9 pgs.
"U.S. Appl. No. 17/501,017, Notice of Allowance dated Aug. 23, 2023", 5 pgs.

* cited by examiner

FIG. 3
Congratulations!
LEVEL
400
All coin purchases just got
25%
BIGGER!
Get Coins!

300

500

500

500

800

SLOTS GAME INTERFACE

FIG. 9
300
DEAL
BUY COINS
10,410,000
10,000,000
BET 150M
2,500,000
BET 15M
5,000,000
BET 75M
1,000,000
1,500,000
BET 3M
BET
100,000
WIN
HOLD FOR AUTO

800

1100

1100

1300

1300

MANAGING COMPUTER-IMPLEMENTED GAME ECONOMIES

This application is a continuation of U.S. patent application Ser. No. 17/501,017, filed Oct. 14, 2021, which is a continuation of U.S. patent application Ser. No. 16/823,279, filed Mar. 18, 2020, now issued as U.S. Pat. No. 11,183,022, each of which is incorporated herein by reference in its entirety.

BACKGROUND

In many games, there is a virtual world or some other imagined playing space where a player/user of the game controls one or more player characters (herein "character," "player character," or "PC"). As used herein, the terms "player," "user," "entity," and "friend" may refer to the in-game player character controlled by that player, user, entity, or friend, unless context suggests otherwise. A game interface providing a game display can in such instances display a representation of the player character. Player characters can be in-game representations of the controlling player. Examples of such games include Farmville™ and the like. In some other games, gameplay is performed on a gameboard in which there is no visual representation of a player character that navigates through the game board. Examples of such games include poker games, slots-based wager games, and the like. In some embodiments, a game interface for the computer-implemented game can instead or additionally comprise an augmented reality display or a virtual reality display. A game engine accepts inputs from the player, determines player gameplay actions, decides outcomes of events and presents the player, via a game interface rendered on a user device, with a game display illustrating gameplay.

In many computer games, there are various types of in-game assets (aka "rewards" or "loot") that a player can obtain within the game. Each game typically has an in-game virtual currency (e.g., gold coins) that denominates the in-game value of various assets, rewards, and other features of the game. A user can typically increase their virtual currency by receiving rewards resulting from successful gameplay, and/or by purchasing the virtual currency for real-world currency (i.e., out-of-game currency such as US dollars). Units of virtual currency are typically expended in the game to purchase in-game assets or to partake in gameplay events, for example in placing wagers or bets in slots-based wagering games. In various games, a player can in addition to virtual currency, acquire game points, experience points, character levels, character attributes, game keys, or other in-game items of value.

Player retention is of significant concern in the provision of such online games, considering that, in contrast to e.g. console games, massively multiplayer online games are typically made available for download and installation free of charge, with game revenue typically being from advertising revenue and in-game spending. Both of these revenue sources are directly and exclusively dependent on continued player engagement and actual gameplay.

Continued player satisfaction and enjoyment (and therefore also player engagement) are more likely when increasing proficiency at playing the game translates to in-game progress and accomplishment, often reflected not only in increasing game level but also resulting in accumulation of larger amounts of expendable. Risk-reward mechanisms can, however, be skewed by such virtual currency balance growth, risking player boredom for lack of challenge. Moreover, differences in the personal economies of players at different game levels often effectively prohibit cooperative or competitive gameplay between or with players across a spectrum of game levels.

BRIEF SUMMARY

One aspect of the disclosure provides for a game server configured to implement a multiplayer online computer-implemented game that provides an inflationary economy system that allows for growth in a player's in-game virtual currency balance (also referred to herein as a player's wallet) with an increase in game level or experience, while at least somewhat restricting growth in the player's in-game purchasing power with the increased virtual currency balance. In some embodiments, the system is configured to allow a player's wallet to grow as the player increases in game level (in some example embodiments expressed as experience points (XP) or an experience level) while maintaining consistent purchasing power across game levels.

The inflationary economy system provided by this disclosure thus in some respects resembles a real-world economy system, in which the value of a fixed normal amount of dollars gradually decreases over time owing to inflation, a while income (e.g., wages or salaries) likewise grow with inflation over time. Thus, as in a typical real-world inflationary economy, the in-game purchasing power of any specific amount of in-game virtual currency progressively decreases with an increase in player experience, game level, or in-game progress.

The term "game level" as used further herein means any relevant metric used for indicating player progress and to which inflation of the virtual currency value of in-game features are linked. In some embodiments, such a metric is based at least in part on in-game success to achieve advancement to higher game levels, e.g. by performing defined tasks such as successfully completing a boss battle at the end of a particular game level. Instead, or in addition, the game level metric may be based at least in part on time spent by the player in playing the game. Instead, or in addition, the game level metric may be based at least in part on a cumulative amount of virtual currency (or, in some embodiments, equivalent real-world currency) spent by the player in the game. In yet further embodiments, the defined game levels may be achieved by the player based on a combination of the above-mentioned metrics or based on similar metrics typically employed in measuring player progress in computer-implemented online games. In a particular embodiment, such as those embodiments illustrated with reference to FIGS. 1-14, players' game level is indicated by an experience point level (commonly referred to as XP level).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
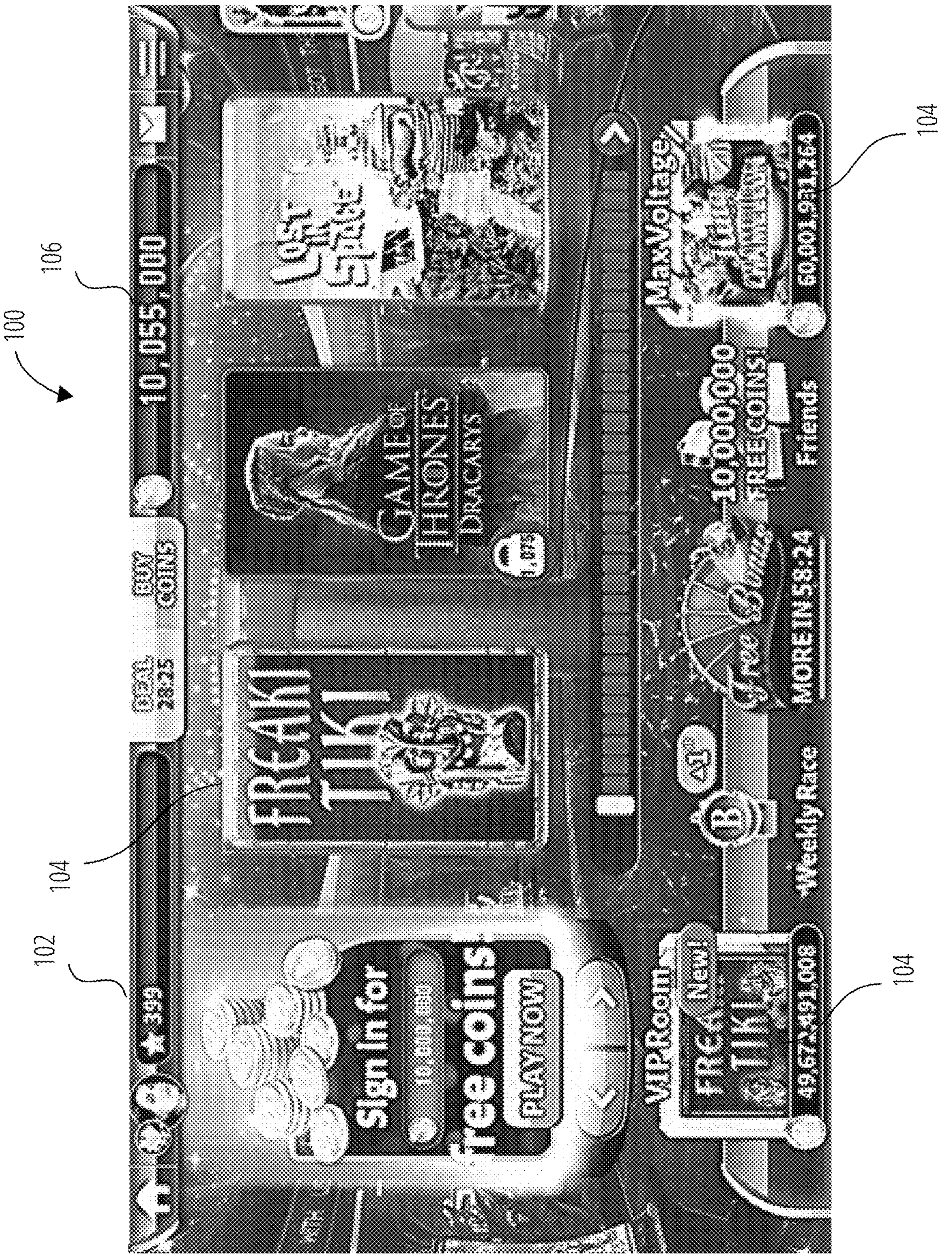
FIG. 1 is a screenshot of a game interface for a computer-implemented online game, according to one example embodiment

Consistent with the brief summary above, it will be seen that one aspect of the disclosure provides for a system or game server configured to implement operations comprising:

at the server system, hosting a computer-implemented online game in which players, during gameplay, incur expenses and receive rewards whose respective in-game values are, in a game interface displayed to a user for playing the game, denominated in an in-game virtual currency, the game defining multiple game levels through which players can progress during extended gameplay; and responsive to a player achieving a particular level increase, in which the play progresses from one game level to another (i.e., progresses from a relatively lower game level to a relatively higher game level), automatically inflating a virtual currency value of one or more features of the game, the one or more features each having identical gameplay functionality in the lower game level and in the higher game level, but each of the one or more features having a greater virtual currency value in the higher game level than in the lower game level.

For ready comprehension, elements of the disclosure introduced broadly as in the foregoing will further in this detailed description be illustrated with reference to an example embodiment in which the game provides a game of chance mechanism in which players place wagers or bets (denominated in the virtual currency) to participate in a particular competitive gameplay event (e.g., competing for a jackpot). In a particular example embodiment, a gameboard includes a game of chance mechanism in the example form of a slots mechanism (e.g., analogous to a slot machine commonly found in casinos) in which a number of virtual reels bearing identical sets of symbols are spun, with success being determined by various combinations of symbols being present in one or more pay lines when the reels spun reels come to a stop. Depending on the results of the game of chance (e.g., on results of spinning the virtual slots), players win and are paid out rewards denominated in the in-game virtual currency.

Note that, in the example embodiment of a slots-based game of chance, the slots mechanism, wagering mechanism, and rewards payout mechanism may in some embodiments function identically for players at different game levels (such features thus having identical gameplay functionality in the different levels), while having different respective virtual currency values for players at different game levels.

Note that, although the disclosure is illustrated by way of example in the context of a game of chance, the inflationary economy mechanism disclosed herein can in other embodiments be employed in non-wagering gameplay. For example, a real-world simulation-like game (e.g., the agriculture-simulation game Farmville™) can provide for automated progressive inflation in the costs of purchasing in-game assets, revenues produced by such in-game assets, a conversion rate for purchasing virtual currency, such other features of the game that are susceptible to having progressively inflated virtual currency values across different game levels.

Similarly, the features of the disclosure that pertain specifically to games of chance can in other embodiments be employed in wagering mechanisms different from a slots mechanism, while utilizing the inflationary economy mechanism disclosed here in to provide progressively increased virtual currency values for respective features of the game.

Some of the one or more game features whose respective virtual currency value may be managed such as to vary across different game levels in some embodiments are briefly mentioned below. These features (which do not provide an exhaustive list of game features to which inflationary value increase may be applied) will be described in greater detail with reference to the drawings:

QUALIFYING BET: in a wagering game being a minimum or threshold bet to participate in a particular event or to unlock certain premium features. Thus, when a player levels up, the virtual currency value (i.e., the denominated coin amount) of qualifying bet features increase, e.g. in accordance with an inflation factor as described below.

VIRTUAL CURRENCY PURCHASE COST: the cost in real-world currency to purchase a fixed amount of virtual currency. In one example embodiment, the virtual currency purchase cost is varied across game levels by varying the number of virtual currency coins sold in a coin package for a given dollar amount. This features also described herein as a conversion rate. As will be described below, the conversion rate may in some embodiments be varied at an inflation rate substantially to a rate of inflation of the other relevant inflationary features of the game. In other embodiments, different inflation factors may be applied to the exchange rate and to other features as virtual currency value is variable with a variation in game level.

REWARDS: The amount of virtual currency units payable for in-game success by a player (in, e.g., a game of chance) can in some embodiments progressively inflated with an increase in game level. Thus, for example, the virtual currency value of a particular jackpot in a slots game may be greater to a player at a relatively higher game level than it is for that same jackpot to a player at a relatively lower game level.

WINNING PROBABILITY/CHANCE: in some embodiments, a player's winning probability in a game of chance for a fixed virtual currency wager amount may vary (e.g., consistent with a universal inflation factor) with variation in game level. In some embodiments, when a player levels up, a higher bet (i.e., having a greater virtual currency value) is required to maintain the same winning probability (also referred to as chance of winning) as at the lower game level.

DESCRIPTION OF EXAMPLE EMBODIMENT

The description that follows includes devices, systems, methods, techniques, instruction sequences, and computing machine program products that embody illustrative embodiments of the disclosure. In the following description, for the purposes of explanation, numerous specific details are set forth in order to provide an understanding of various embodiments of the disclosed subject matter. It will be evident, however, to those skilled in the art, that embodiments of the disclosed subject matter may be practiced without these specific details. In general, well-known instruction instances, protocols, structures, and techniques are not necessarily shown in detail.

A specific example embodiment of the disclosure will now be described with reference to FIG. 1-FIG. 14, which illustrate implementation of an inflationary economy system as discussed broadly above in a game that includes a number of game of chance mechanisms in the example form of slots-based games or slots mechanisms. A player can in some example embodiments select between a number of different slots games provided in the game. For each slots game, the player can place a bet in the size of the player's choosing, denominated in an in-game virtual currency, provided that the bet is equal to or larger than a qualifying bet or minimum wage. The player cannot, of course, place a bet higher than the current virtual currency balance to which the player has access.

Figure 15:
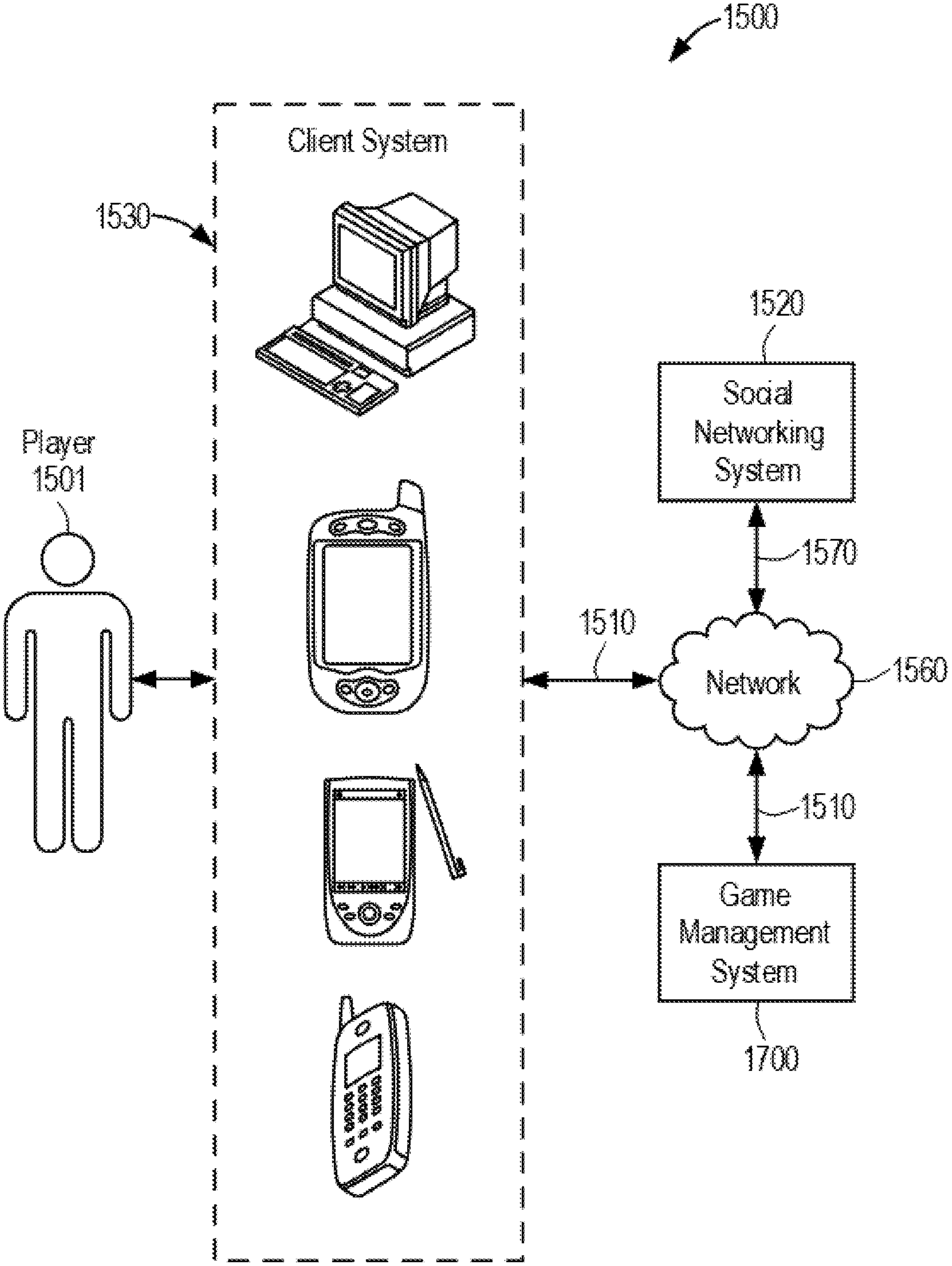
FIG. 15 is a schematic diagram showing an example of a system, according to some example embodiments.

FIG. 1 is a screenshot of a game interface 100 rendered on a user device such as a mobile phone (see, e.g., a user device 1530 in FIG. 15), showing a home screen or lobby for a slots-based computer-implemented game, according to one example embodiment. In the game interface 100 of FIG. 1, a player associated with the respective user device has progressed to game level 399 out of 5000+ game levels defined by a game server managing the game. In one example embodiment discussed herein, a management is provided by a game engine 1710 (FIG. 17) implemented by a game management system 1700 (FIG. 15).

In this example embodiment, game levels to which is indexed stepwise inflationary decreases in the purchasing power of the virtual currency are defined by different experience levels, commonly referred to as experience points (XP). Note that the game interface 100 includes a game level indicator in the example form of an XP counter 102, in this case indicating the player's XP level as 399. As will be familiar to a person of ordinary skill in the art, a player's XP level progressively increases based on one or more gameplay metrics that can include gameplay time, in-game expenditures, in-game achievements or level-up actions, or a combination of such metrics. It will be appreciated that different metrics for game level advancement may be defined in different games, or at different stages of the same game.

The game interface 100 also displays a wallet 106 for the player, indicating the player's current balance of in-game virtual currency. In this example embodiment, the wallet amount is denominated in virtual gold coins. Thus, the game interface 100 of FIG. 1 indicates that the player has 10,055,000 available coins to spend in the game. In the game lobby displayed by the game interface 100 of FIG. 1, a number of different game game icons 104 are displayed. The respective game icons 104 are selectable to launch respective corresponding slots games or mini games provided by respective slot game mechanisms within the larger game.

A number of features of the game are in this example embodiment are subject to inflation (such features occasionally being referred to herein as inflationary features), so that the in-game currency values of the inflationary features are increased at certain predefined game levels (in this example embodiment, at certain predefined XP levels). As will be described in greater detail below, inflationary features of the example game of FIG. 1-FIG. 14 include:

- a conversion rate at which real world currency is exchanged for in-game virtual currency (as discussed below with reference to FIG. 5-FIG. 7);
- a qualifying bet (e.g., a minimum wager) to be placed in order to a slots game (as discussed below with reference to FIG. 8 and FIG. 9);
- rewards or winnings payout amounts, as denominated in virtual coins in the present example embodiment being expressed as jackpot coin amounts (as discussed below with reference to FIG. 11 and FIG. 12); and
- a statistically calculated winning probability (e.g., the respective chance to win a jackpot) for a fixed amount of virtual coin. Thus, as will be described in greater detail elsewhere, a player's winning probability acquired per unit of virtual coin creases with inflation, so that if two players at different XP levels wager an identical virtual coin amount on a slots game for a common jackpot, the player at the lower of the two XP levels has a higher winning probability than the player at the higher XP level.

Figure 2:
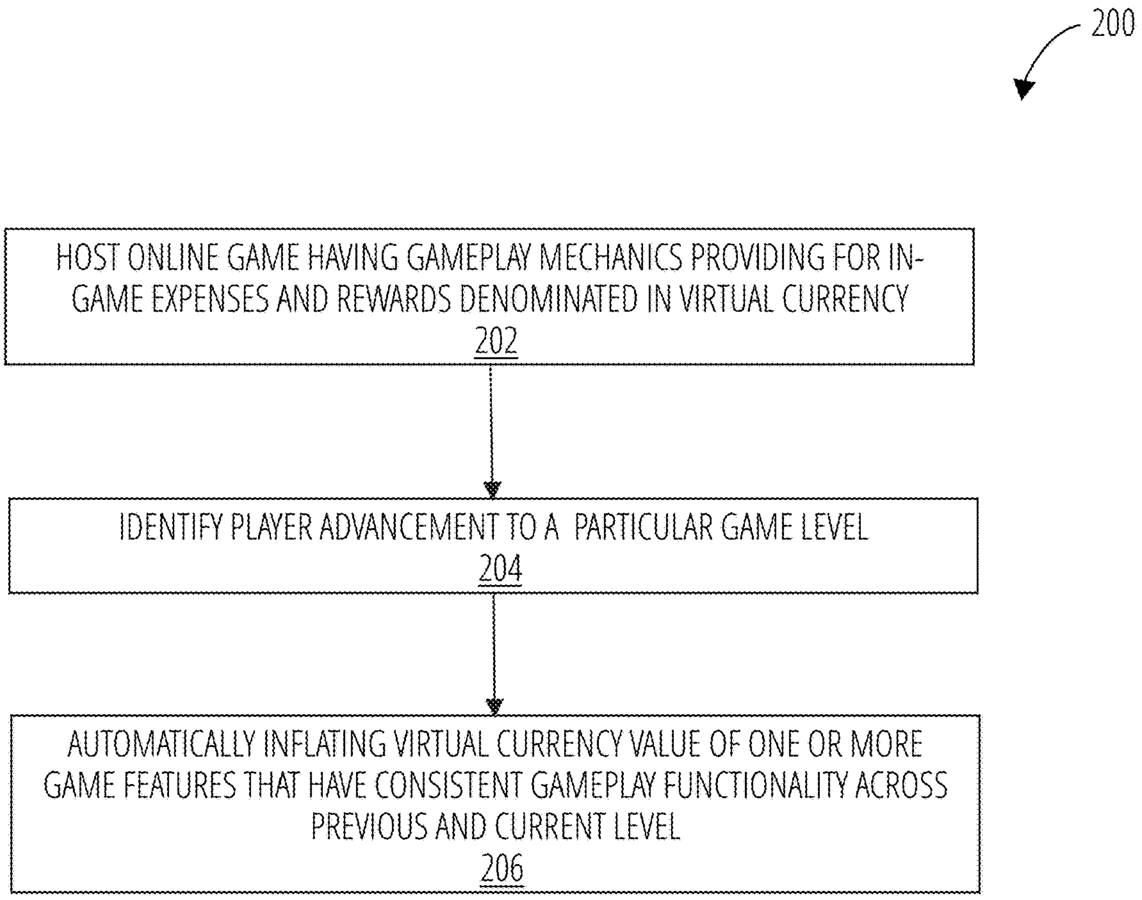
FIG. 2 is a flowchart showing a high-level view of a method for implementing a multiplayer online game with an inflationary economic system applied to an in-game virtual currency in which the values of various in-game features are denominated, according to one example embodiment
Figure 3:
FIG. 3 is a screenshot of a pop-up notification with respect to the stepwise inflationary increase triggered by player advancement to a predefined corresponding game level, according to one example embodiment

Turning now to FIG. 2, therein is shown a high-level flowchart of a method 200 for automated provision and management of a computer-implemented multiplayer online game that implements an inflationary economy system for in-game virtual currency, according to one example embodiment of the disclosure. In this example embodiment, the method 200 provides a high-level view of providing the slots-based game of chance as described with reference to the various screenshots and game interfaces 100 illustrated in the drawings.

Figure 17:
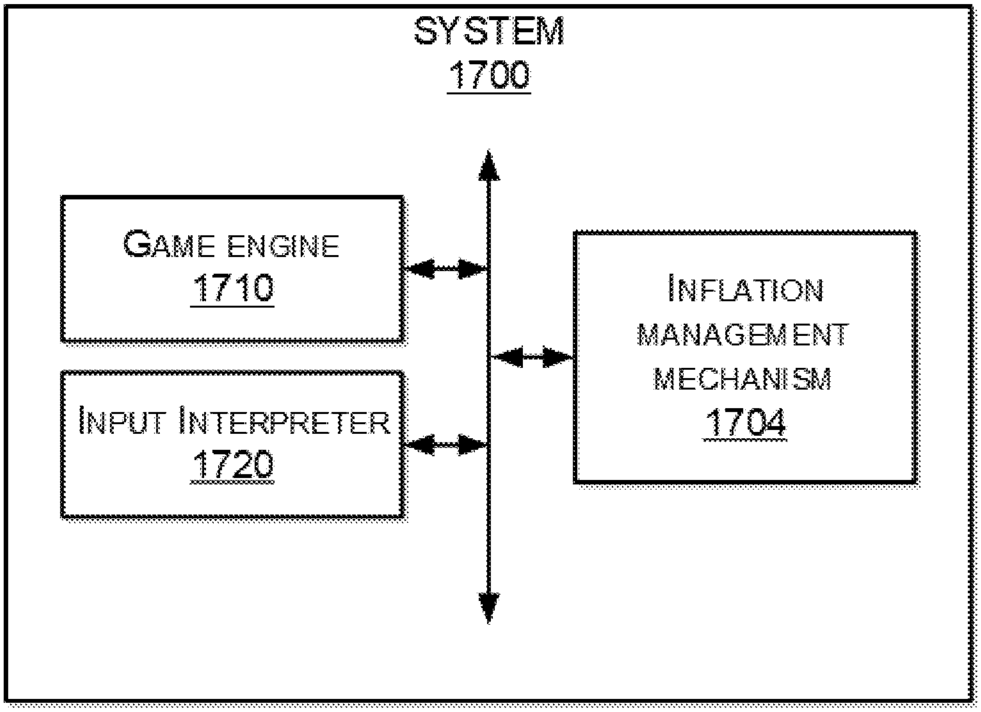
FIG. 17 is a block diagram illustrating components of a game management system, according to some example embodiments.

The method 200 comprises, at a server system (in the present example embodiment provided by the game management system 1700 of FIG. 15 and FIG. 17), hosting (operation 202) the game by enabling and managing interactive online gameplay, during which players incur expenses and receive rewards. The expenses and rewards have respective in-game values that are, in a game interface (e.g., game interface 100), denominated in an in-game virtual currency. In the present example embodiment, expenses include the placing of bets for wages and the acquisition of virtual currency (e.g., virtual coin), while rewards include winnings or prizes earned for successful combinations of symbols in slots games on which the player placed bets.

As discussed previously, the game engine 1710 defines multiple game levels (in this example embodiment being provided by respective XP levels) through which players can progress during extended gameplay. As can be seen from Table 1 below, game engine 1710 in the present example embodiment provides for progressive inflation management maxing out at XP level 4500. Moreover, the example embodiment provides for an inflation management mechanism 1704 to implement an automated inflationary economy with respect to the relevant inflationary features of the game, as discussed previously. To this end, the Inflation management mechanism 1704 defines, for each of the XP levels, a corresponding universal inflation factor that applies through the inflationary features of the game at that XP level. Respective inflation factors for one example embodiment are given by Table 1.

TABLE 1

XP Level and Inflation Factor

| XP Level | Inflation factor |
|---|---|
| 1 | 1.00 |
| 10 | 1.50 |
| 25 | 2.25 |
| 50 | 3.00 |
| 100 | 3.75 |
| 200 | 4.75 |
| 300 | 6.00 |
| 400 | 7.50 |
| 500 | 9.50 |
| 750 | 10.50 |
| 1000 | 11.75 |
| 1250 | 13.00 |
| 1500 | 14.50 |
| 1750 | 16.00 |
| 2000 | 17.75 |
| 2250 | 19.75 |
| 2500 | 21.75 |
| 2750 | 24.00 |
| 3000 | 26.50 |
| 3500 | 29.25 |
| 4000 | 32.25 |
| 4500 | 35.50 |

Note that there is in this example embodiment a single inflation factor that applies to any given XP level. This inflation factor thus serves as a universal inflation factor that is applied equally to all of the inflationary features of the game at the corresponding XP level. As a result, inflation in virtual currency values (and commensurately a decrease in purchasing power for a fixed coin amount) does not skew or distort the proportional relationship between respective inflationary features following a jump in inflation factor. Thus, as a crude example, if a given outcome in a slots game pays out a 1000 coin reward on a 100 coin qualifying bet at XP level 1 (inflation factor 1.00), then the identical outcome in that slots game will pay out a 6000 with reward on a 600 coin qualifying bet at XP level 300 (inflation factor 6.00).

In other embodiments, however, two or more different inflation factors can be provided for different features across XP levels. In such cases, proportional relationships between the various inflationary features within levels will be different for different levels. Benefits of such a mechanism may include enhanced ability for game administrators to tune the game for improved player retention.

Note also in Table 1 that the universal inflation factor in this example embodiment is increased stepwise, but not at each XP level. Instead, the game engine 1710 defines a subset of XP levels at which the inflation factor jumps. Thus, for example, the inflation factor remains 1.00 for XP levels 1 through 9, being set at 1.50 only when the player advances to XP level 10. Likewise, the XP level remains constant at 14.50 from XP level 1500 to XP level 1749.

In other embodiments, inflation factor increase can be performed at each game level or XP level. In yet further embodiments, inflation factor variation can be even more finally graded.

Returning now to FIG. 2, it will be seen that the method 200 further comprises, at operation 204, identifying advancement of a player to a particular game level, so that the player progresses from a relatively lower game level to a relatively higher game level. In the present example embodiment, identification of a particular predefined game level advancement (at operation 204), which triggers inflationary increase, at operation 206, applies only to advancement to those XP levels represented in Table 1.

Responsive to identifying that the player has advanced to one of the predefined subset of inflation-step game levels, the game engine 1710 automatically inflates, at operation 206, respective virtual currency values of one or more features of the game. In particular, the respective values of the inflationary features previously discussed is in the present example embodiment automatically inflated by applying to those inflationary features the inflation factor corresponding to the newly achieved XP level, which is greater than the inflation factor at the immediately prior XP level.

Note that the inflationary features have identical gameplay functionality at the newly achieved XP level and at the previous XP level, differing only in their respective values denominated in virtual coin. Such features with consistent gameplay functionality across game levels are to be distinguished from conventional mechanisms that unlock, responsive to progress within the game, new gameplay functionality, new types of expenditures, new types of revenue, or entirely new features. As will be seen later, such consistent functionality across gameplay levels, combined with the disclosed inflationary economy mechanism, beneficially permits cooperative or competitive gameplay by players across a wider range of XP levels with respect to a common objective, task, or competition than is typically the case in multiplayer online games of the types described.

In this example embodiment, the method 200 includes, upon performance of an inflationary increase, at operation 206, the additional automated operation of notifying the player of the applied inflationary change in the virtual coin value of at least some of the inflationary features. As illustrated by example in FIG. 3, operation 206 in this example embodiment includes automated display of a pop-up notification 300 in the game interfaces 100.

The pop-up notification 300 in the illustrated example informs the player of advancement to XP level 400, and further notifies the player of the particular applicable inflationary increase in the amount of virtual coins that can be purchased for a given dollar amount. In particular, each dollar value coin package will in this example instance have 25% more coins at Level 400 than had XP level 399. As will become evident from the discussion of conversion rate inflation that follows below with respect to FIG. 5-FIG. 7, the notified 25% purchasing power inflation in this instance results from a Level 400 inflation factor of 7.50, which is 25% more than the level 399 inflation factor of 6 (see Table 1).

In some embodiments, the method may include providing a similar pop-up notification to the user in anticipation of advancement to an XP level at which an inflationary increase will be triggered. Thus, in the present example embodiment, a similar pop-up notification may be displayed in the game interface 100 while the player is at XP level 399, indicating that 25% bigger coin purchases will be triggered at XP level 400. These notifications not only motivate the player to continue playing until the next inflation step-up level is reached, but also enhances the player's awareness of increasing clout and progress within the game. Both of these factors serve to promote player retention.

Figure 4:
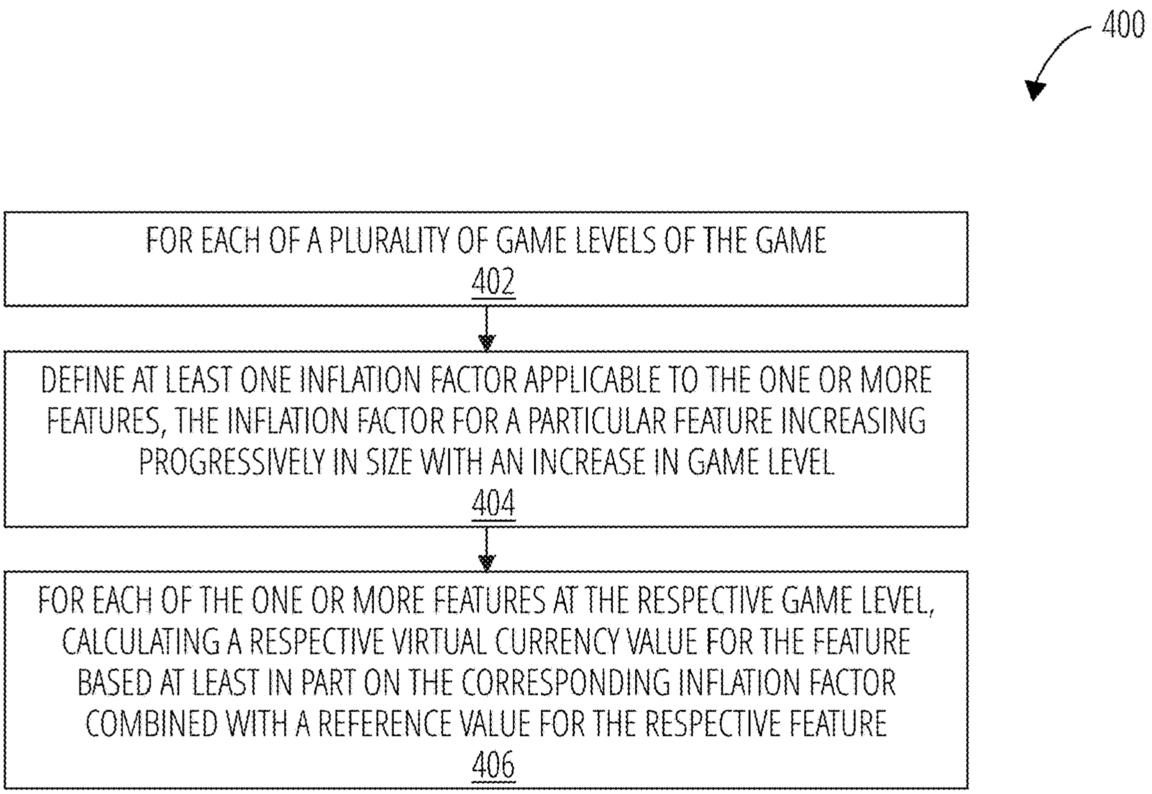
FIG. 4 is a flowchart corresponding to that of FIG. 2, illustrating a lower level view of method for implementing a game with an inflation economy system, according to one example embodiment.

Turning now to FIG. 4, therein s shown a lower-level flowchart 400 for a method of implementing an inflationary economy consistent with the method 200 of FIG. 2. The flowchart 400 shows the operations of, for each of a plurality of game levels (represented by block 402), defining, at operation 404, at least one inflation factor applicable to the relevant predefined inflationary features, as discussed. In the present example embodiment, operation 404 is performed by the inflation management mechanism 1704 by storage, management, and application of the inflationary schema defined by Table 1, as discussed. It will be appreciated that database entries representing the schema of Table 1 is stored, e.g., in a linked table or database of the inflation management mechanism 1704, and is automatically applied to the various inflationary features controlled by the game engine 1710.

Again, it is noted that the game system 1500 in the example embodiment provides a single universal inflation factor for each of a number of tiers of XP levels, with the subset of XP levels represented in Table 1 being step up levels at which the inflation factor is increased. It will be noted that the inflation factor progressively increases with an increase in XP level.

Note further that a curve represented by the inflation factor as a function of XP level does not in this example embodiment have a constant gradient, so that the inflation factor does not increase linearly. Instead, step ups in the universal inflation factor are at their greatest initially, progressively tapering down. This serves to provide novice players with significant early gains in virtual currency balance, again serving to promote player retention.

At operation 406, a respective virtual currency value for each of the inflationary features is calculated based at least in part on the corresponding inflation factor combined with a reference value for the respective feature. Such calculation of the inflation-sensitive virtual point values of the different inflationary features will now be illustrated by way of example with reference to the previously described example slots game.

In the present example embodiment, a respective reference value for each of the inflationary features is defined as the initial value of that feature, i.e., the virtual coin value at XP level 1. It follows that, as shown in Table 1, the inflation factor for XP level 1 is 1.00.

The inflation factor at a certain XP level defines a multiple applied to the initial amounts at level 1 for qualifying bets, buy page coin amounts and jackpot amounts versus the initial amounts at Level 1. It is again emphasized that different mathematical models can be used in other embodiments to similarly or analogously effect synchronized inflation in virtual currency value of a plurality of interrelated and cooperating features indexed to an increase in the game level achieved by the player.

The respective formulas implemented by the inflation management mechanism 1704 to calculate the respective virtual currency values of the above-mentioned inflationary features at different respective XP levels are as follows:

Qualifying bet of a feature for a player at Level *N*=Qualifying bet of the feature for the same player at Level 1*×Inflation factor at Level *N* (1)

Buy page coin amount of a package for a player at Level *N*=Buy page coin amount of the package for the same player at Level 1*×Inflation factor at Level *N* (2)

Coin amount of a jackpot (if won) for a player at Level *N*=Reference coin amount of the jackpot pool×Inflation factor at Level *N* (3)

As will be described in greater detail below with reference to FIG. 10-FIG. 12, the inflationary mechanism in some example embodiments provides for competitive gameplay between players across a wide range of XP levels, on a relatively equal footing, for the same prize/reward for a common goal. In the described example embodiment of a slots-based game of chance, players at different XP levels can compete for the same jackpot, although the virtual coin value of the jackpot is different for players at different inflationary tiers.

When a player bets on a machine with a jackpot, the player contributes a certain percentage of the bet to the jackpot pool. The chance to win the jackpot is directly proportional to the contribution. In some embodiments, including the presently described examples, the winning probability for a bet is one of the inflationary features that is dynamically adjusted based on the applicable universal inflation factor. In this particular embodiment, the inflation factor adjusts the contribution amount of the bet as follows:

Contribution percentage of a bet to a jackpot pool by a player at Level *N*=Reference contribution percentage of the bet to the jackpot pool by the player*÷Inflation factor at Level *N* (4)

Note that in some example embodiments, one or more inflationary features may not be available at XP level 1 (e.g., the purchase of virtual coin packages are in some cases not available at level 1). In such instances, however, the inflation management mechanism 1704 nevertheless defines a hypothetical coin package value for level 1, which hypothetical number is used as reference value for calculating respective coin package values at higher XP levels.

These calculations will now be illustrated by way of arbitrary example in the above-described embodiment. We shall first consider the calculation of virtual coin values for coin packages purchased in US dollars.

Examples for Calculating Coin Package Values

Suppose Player X is at XP Level 310. According to the governing inflation in for this example embodiment, the inflation factor applicable to player X is thus 6.00.

Now suppose a $0.99 package has a virtual coin value of 10,000 coins for a Level 1 player at a certain time. The $0.99 package for Player X will then provide 10,000×6=60,000 coins for the same amount of real-world currency.

Figure 5:
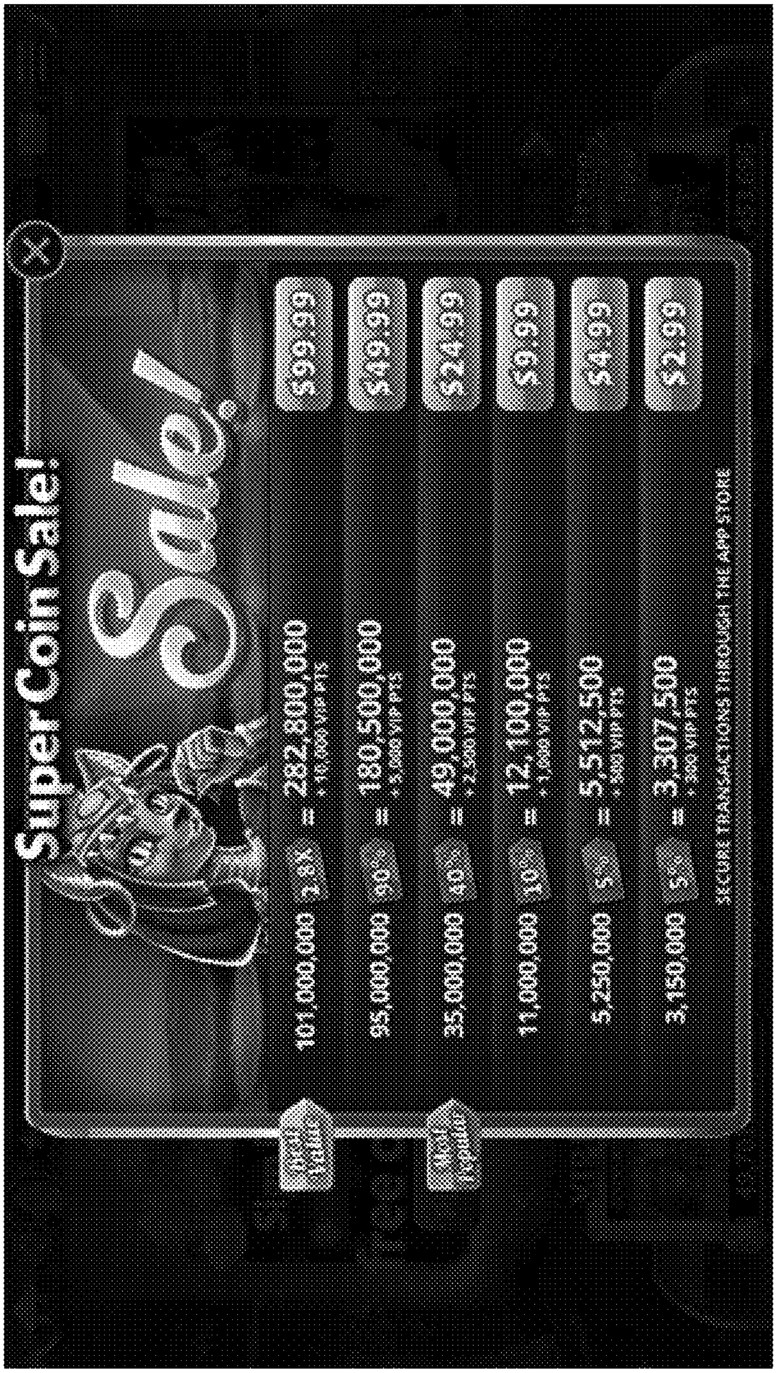
FIG. 5 shows a screenshot of a buy page for packages of virtual coins, displayed to a player at XP level 1, according to an example embodiment
Figure 6:
FIG. 6 shows a screenshot of a buy page corresponding to that of FIG. 5, but being displayed to a player at XP level 50, according to an example embodiment
Figure 7:
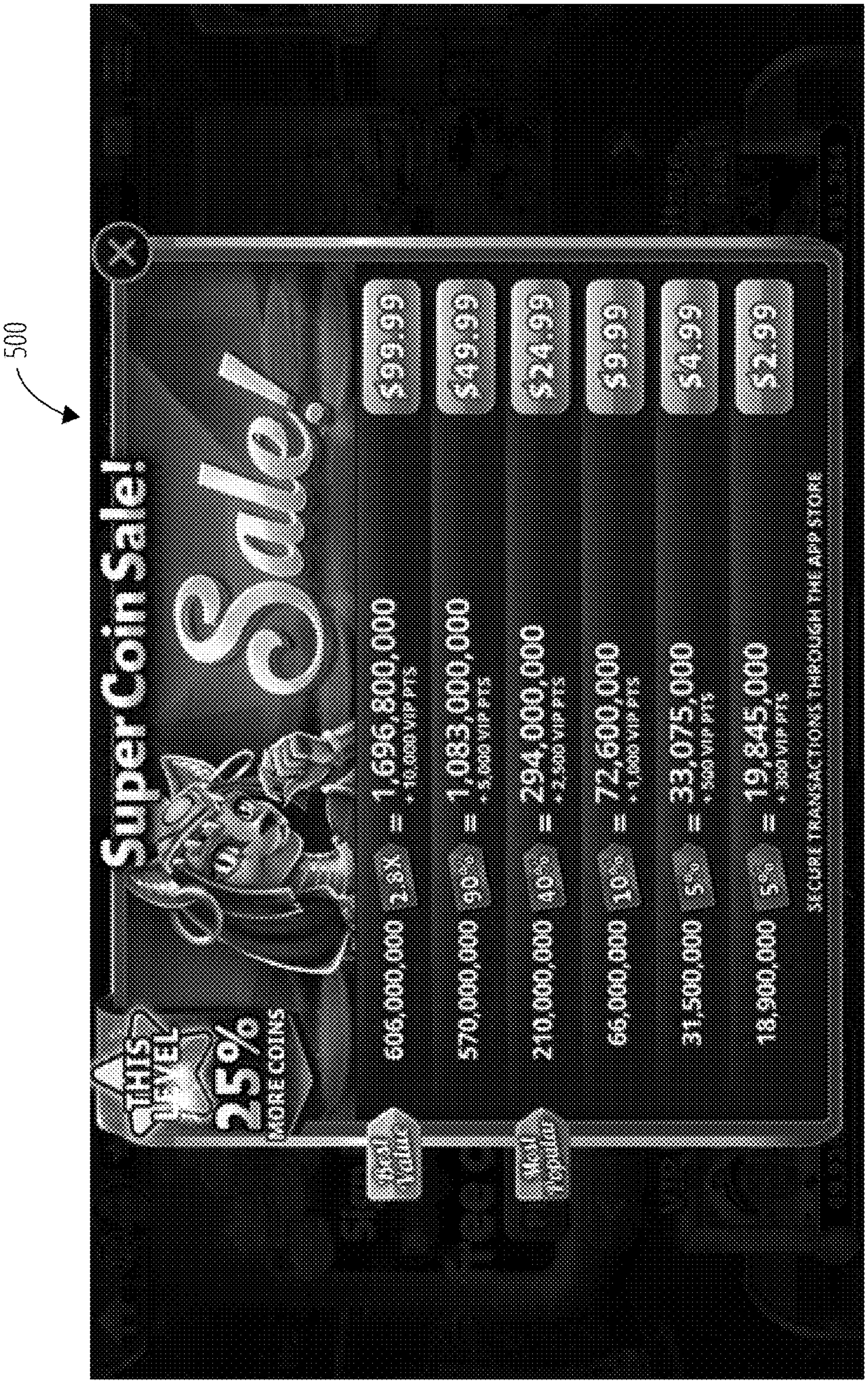
FIG. 7 shows a screenshot of a buy page corresponding to that of FIG. 5, but being displayed to a player at XP level 300, according to an example embodiment

FIG. 5-FIG. 7 are screenshots of respective buy pages 500 displayed at substantially the same time in respective game interfaces 100 of players at different respective XP levels. Note that the amount of coins in coin packages increases at the same rate as the inflation factor when a player levels up. For ease of reference, the relevant inflation factors applicable to FIG. 5-FIG. 7 is repeated in Table 2 below.

| Level | Inflation Factor |
|---|---|
| 1 | 1.00 |
| 50 | 3.00 |
| 300 | 6.00 |

FIG. 5 is a buy page 500 of a Level 1 player. A $2.99 package provides 3,307,500 virtual coins. FIG. 6 is a buy page 500 of a Level 50 player on the same day. All coin packages contain about 3 times as many as those coin packages in FIG. 5. This is because the inflation factor for level 50 is 3 times as large as the inflation factor for level 1. For example, the number of coins in the $2.99 package is 3 times the amount in FIG. 1: 9,922,500=3×3,307,500.

FIG. 7 is a buy page 500 of a Level 300 player on the same day. All coin packages contain 6 times as many as the coin package indicated by the level 1 buy page 500 of FIG. 5. Again, this is because the ratio between the inflation factors for level 300 and level 1 is 6:1. For example, the number of coins in the $2.99 package is 6 times the amount in FIG. 1*a:* 19,845,000=6×3,307,500.

Examples for Calculating Qualifying Bets

Suppose a certain feature (e.g., a particular one of the slots games available within the broader game) has a qualifying bet at Level 1 of 50,000 coins. The qualifying bet of this feature for Player X (at level 310; inflation factor 6.00) would be 50,000×6=300,000 coins. It means Player X has to bet at least 300,000 coins per bet to qualify for this feature.

Figure 8:
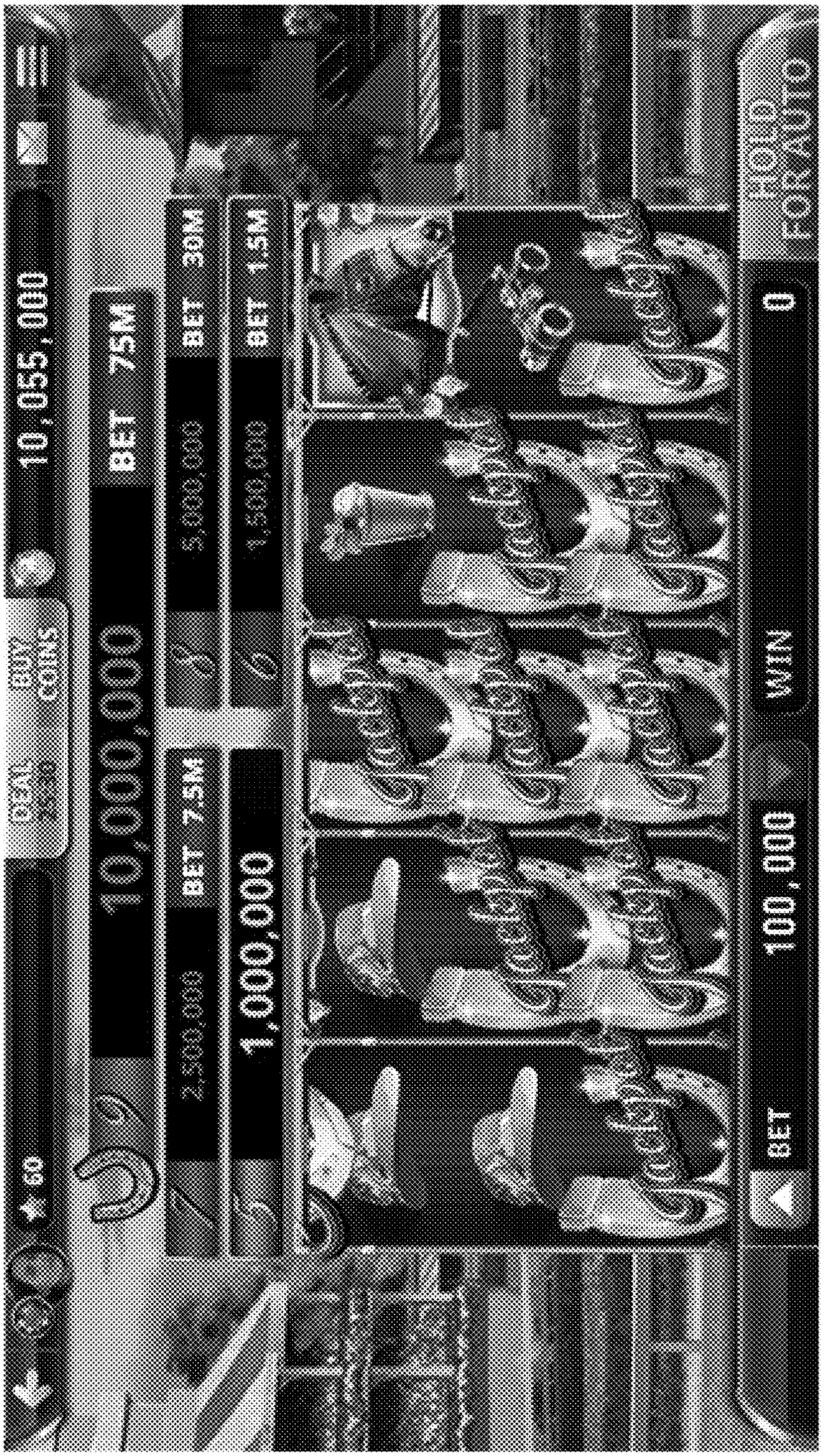
FIG. 8 shows a screenshot of a game interface for a slots-type game, displayed to a player at XP level 60 and indicating minimum qualifying bets for playing the slots game, according to one example embodiment.
Figure 9:
FIG. 9 shows a screenshot similar to that of FIG. 8, but being of an interface displayed to a player at XP level 300, according to an example embodiment

FIG. 8 and FIG. 9 are screenshots of respective slots game interfaces 800 for players at XP level 60 and 300 respectively. As shown in table 1, the inflation factor for level 60 is 3.00 and the inflation factor for level 300 is 6.00.

FIG. 8 shows the slots game interface 800 of a level 60 player. There are five special prizes indicated by the interface 800 numbered 5, 6, 7, 8 and 9 respectively. With the exception of prize #5, the remaining three prizes require a minimum bet or qualifying bet to trigger. For example, a player at Level 60 is required to bet 1,500,000 coins to qualify for prize #6. The relevant qualifying bet or minimum wager is shown by the words "BET 1.5M" next to prize #6.

FIG. 9 is likewise a screenshot of the same slot game of FIG. 8, but for a Level 300 player. The same prize #6 requires this player to bet 3,000,000 coins to qualify. It is shown by the words "BET 3M" next to prize #6. This value is twice the qualifying bet at Level 60, because the ratio between the inflation factors of level 300 (6.00) and level 60 (3.00) is 2:1.

Figure 10:
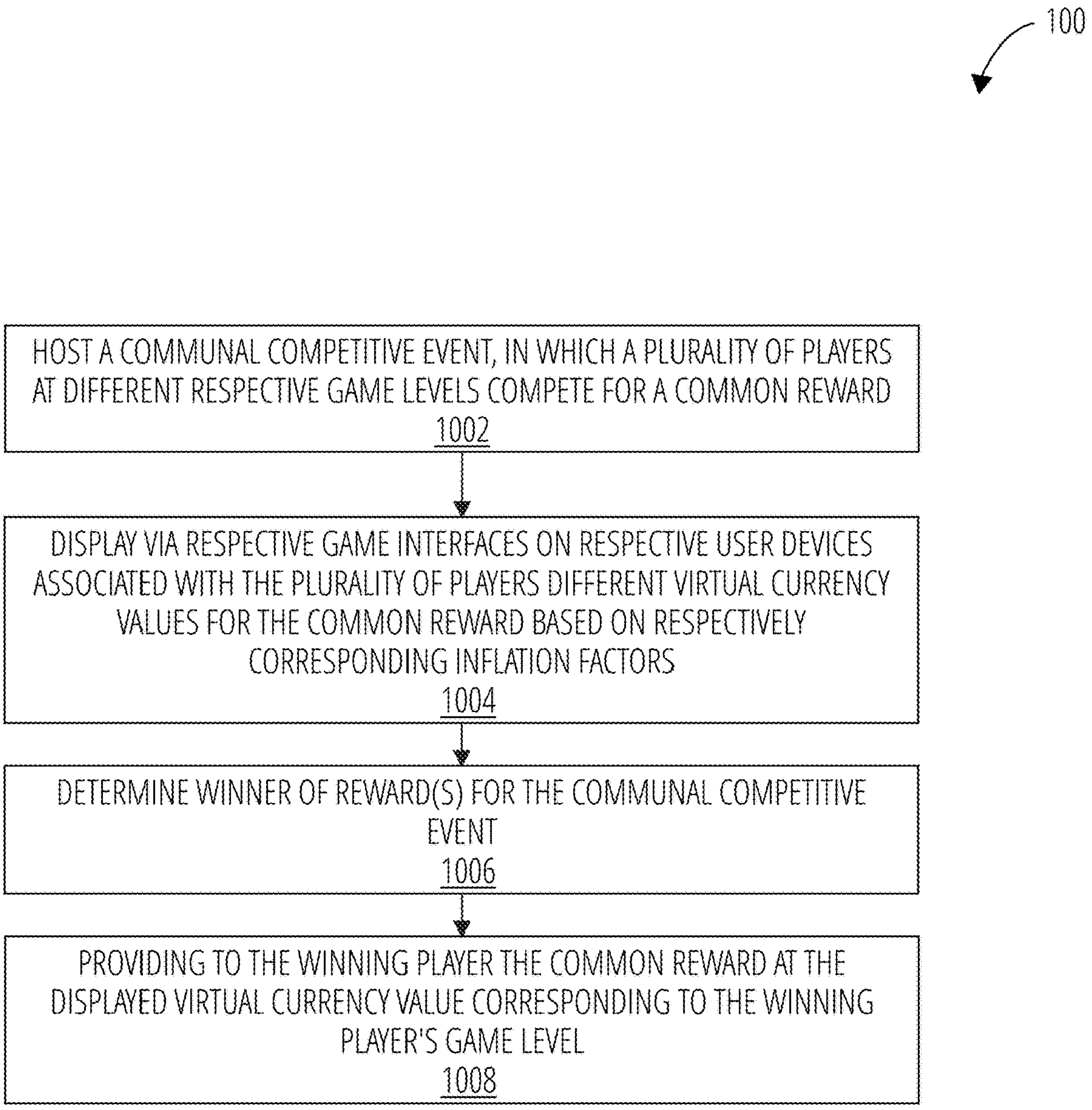
FIG. 10 is a flowchart for a method of providing and managing a competitive event in which players experiencing different levels of inflation of a virtual in-game currency compete for the same reward or prize, according to an example embodiment

Turning now to FIG. 10, therein is shown a flowchart 1000 for a method of implementing features of the disclosure relating to facilitating and promoting gameplay events, competitions, or games in which players across a wide range of game levels can participate without undue prejudice to either players and lower game levels or two players at higher game levels. These features will be described below with reference to the example embodiment of a communal competitive event in the form of a jackpot winnable via a betting on a slots game to all players irrespective of their game level.

Thus, operation 1002 comprises hosting such a communal competitive event (e.g., a game of chance), in which a plurality of players at different respective game levels compete for a common reward, e.g., a common jackpot. Note that the jackpot or other common reward is referred to as a common reward not in that it is winnable in common (in some embodiments only a single player when the jackpot), but that the players all compete for the same prize.

In operation 1004, the game system 1500 displays via respective game interfaces 100 on respective user device 1530 associated with the plurality of players different virtual currency values for the common reward based on respectively corresponding inflation factors. Thus, although all players compete, for example, for the same jackpot (when the jackpot value is in this example embodiment expressed in terms of the reference value or in terms of value in real-world currency) the advertised and winnable virtual coin value of the jackpot is different for at least some players who are at different XP levels.

In other words, a first player at a first game level competes for a lower virtual currency value for the common reward than a second player at a second game level higher than the first game level. In addition, qualifying bets for playing the communal competitive event may again be variable based on the respective governing inflation factors, as explained above with reference to FIG. 8 and FIG. 9.

At operation 1006, the communal competitive event is played (e.g., bets are placed for the slots mechanism and the game is executed by one or more cycles of spinning in the slot reels) and a winner (or in some instances winners) of the reward(s) is determined.

In operation 1008, the common reward is paid out to the winning player in the virtual currency amount calculated for the winning player based on their respective inflation factor.

An example of a jackpot game that provides a communal competitive event consistent with the method of flowchart 1000 will now be described with reference to FIG. 11-FIG. 14.

First, however, some briefly examined inflationary considerations for such a communal jackpot game in an inflationary economy as disclosed, where players at different levels have different in-game purchasing power for per unit of real-world currency.

Again consider a player X at XP level 310 (in the example inflation scheme of Table 1 being at inflation factor 6) and a level 1 player participating in common in the same jackpot game. Calculation of the jackpot amount (expressed in virtual coin amount) for the respective players is in this example embodiment performed using equation (3) above.

Suppose a reference coin amount of the jackpot pool is 10,000,000 coins. If a Level 1 player wins it at this moment, the amount won will be 10,000,000 coins. If Player X wins it, the amount won will be 10,000,000×6=60,000,000 coins.

Note that the disclosed inflationary economy in this example embodiment affects not only the virtual coin amount for qualifying bets and the virtual coin amount for the jackpot pool, but also as mentioned previously with reference to equation (4), also has a bearing on the winning probability applied to each player and used, at operation 1006 to determine the winner of the jackpot.

Suppose the reference contribution percentage for an available jackpot pool is defined at 0.6% of the jackpot pool value. If the Level 1 player bets on the relevant slots machine, the contribution to the pool by this player is 0.6% of the bet placed. If Player X bets on the machine, the contribution to the pool by Player X is 0.6%÷6=0.1% of the bet placed.

For instance, if a Level 1 player bets 100,000 coins, the contribution to the pool (expressed in level 1-value coins) is 100,000×0.6%=600 coins. If Player X bets an identical 100,000 coins, the contribution to the pool will only be 100,000×0.1%=100 coins.

Figure 11:
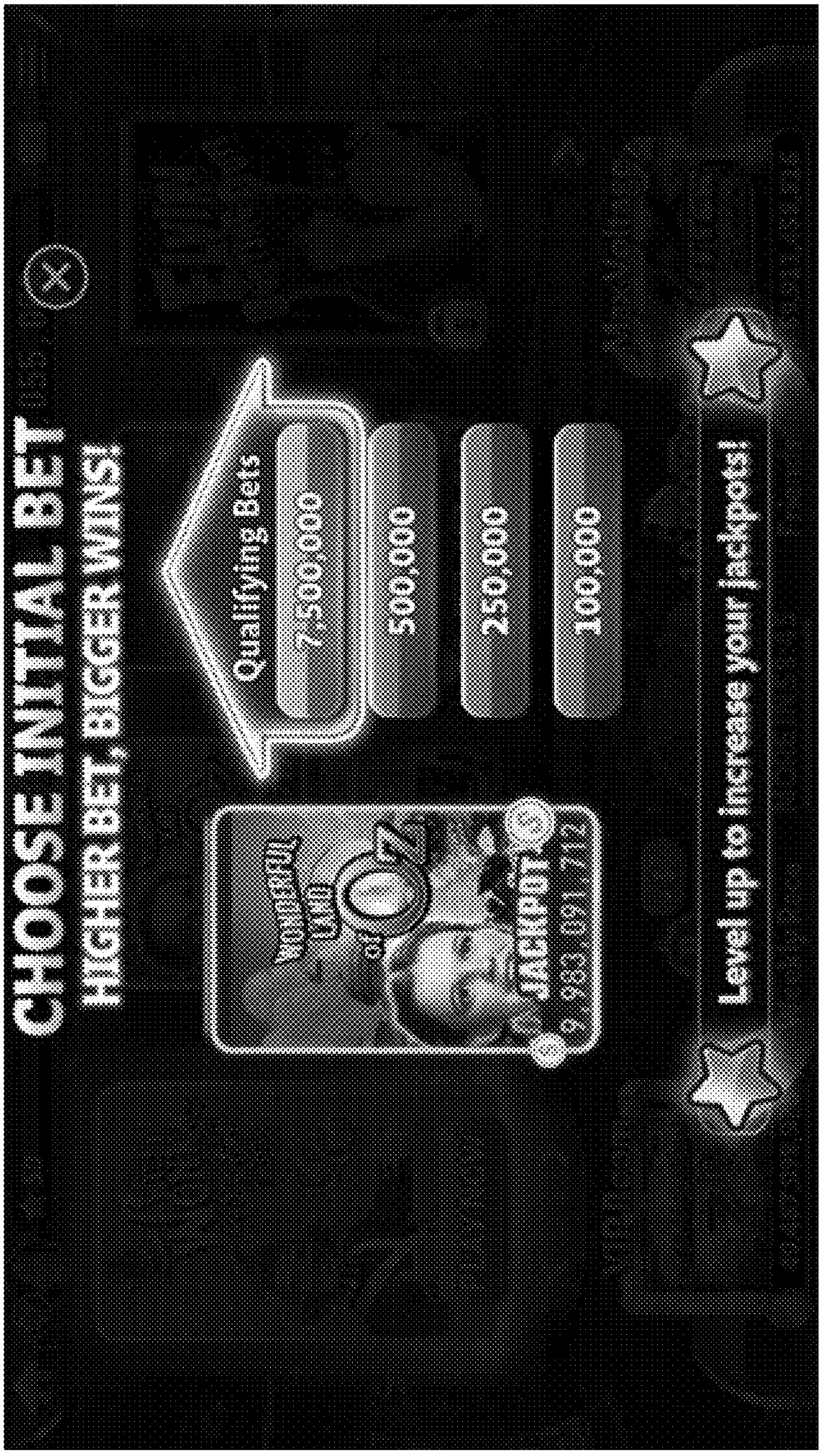
FIG. 11 is a jackpot game interface displayed to a player at XP level 60, according to an example embodiment.
Figure 12:
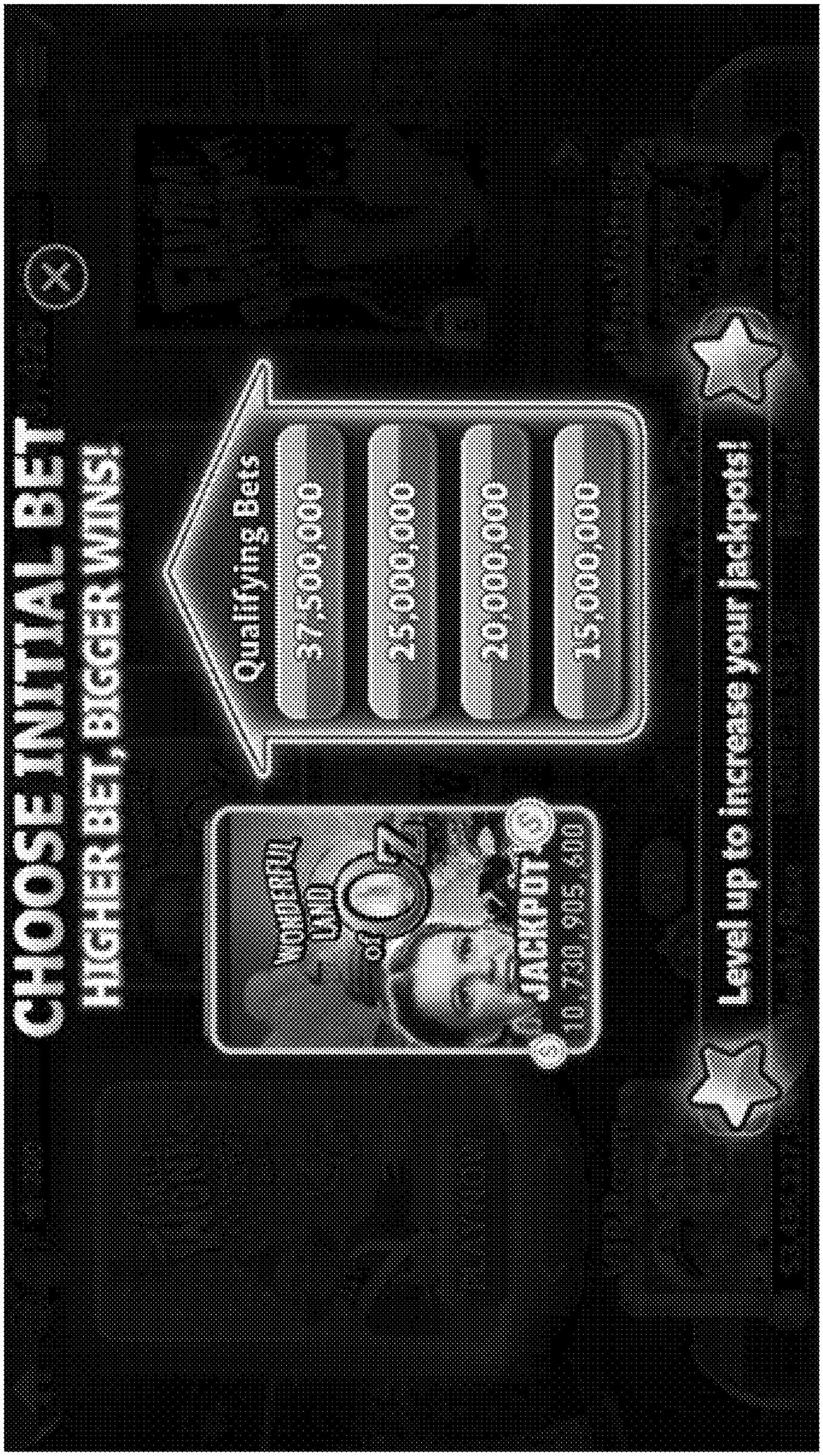
FIG. 12 is a jackpot game interface displayed to a player at XP level 300, according to an example embodiment
Figure 13:
FIG. 13 is a screenshot of a VIP room interface for a stock-based game, the displayed to a player at XP level 50.
Figure 14:
FIG. 14 is a screenshot of a VIP room interface for a stock-based game, as displayed to a player at XP level 300, according to an example embodiment.

FIG. 11-FIG. 14 show a series of screenshots graphically illustrating user experience of an example embodiment of a communal competitive game between players is significantly different game levels in a game having an inflationary economy again covered by the example inflationary increase scheme of Table 1. FIG. 11 and FIG. 13 are screenshots of interfaces displayed to a level 50 player, to whom an inflation factor of 3 applies. In direct juxtaposition, FIG. 12 and FIG. 14 shows corresponding screenshots of interfaces displayed to a level 300 player, to whom an inflation factor of 6 supplies. A governing ratio between the respectively applicable inflation factors is thus 6:3=>2:1.

FIG. 11 is a screenshot of a jackpot game interface 1100 displayed to a Level 60 player when entering a slot game with jackpot. The player is required to bet 7,500,000 coins per spin to qualify for the jackpot. Any smaller bet is not a qualifying bet for that player.

FIG. 12 is a screenshot similar to that of FIG. 11, but showing the jackpot game interface 1100 displayed to the Level 300 player when entering the same slot game. The level 300 player is set a minimum bet of 15 million coins per spin to qualify for the jackpot. Note that the value for this qualifying bet is twice the qualifying bet at Level 50 responding to the 2:1 ratio between the respective inflation factors.

FIG. 13 is a screenshot of a VIP room interface 1300 when the Level 50 player enters a VIP room provided by the game. Note that there are in this example embodiment three available jackpots, namely "VIP JACKPOT", "MAJOR" and "MINI". Also note the respective jackpot pools displayed for these respective jackpots.

FIG. 14 is a screenshot of a VIP room interface 1300 displayed to the Level 300 player upon entering the same VIP room at nearly at the same time. Note that each jackpot amount is about twice that of the corresponding jackpot for the Level 50 player. (Note that the jackpot amounts are not exactly twice those in FIG. 13 only because the screenshots were taken by some seconds apart, allowing or a small amount of natural growth in the jackpot amounts.)

Example Architecture of Social Network Systems and Game Management Systems

Example systems, architectures, and hardware components that may be employed in provision of the functionalities discussed above with reference to FIGS. 1-14 are briefly discussed below.

FIG. 15 illustrates an example of a system for implementing various disclosed embodiments. In particular embodiments, system 1500 for enabling online gameplay by player 1501 comprises social networking system 1520, game management system 1700 (e.g., an online gaming system provided by a game server or game server system providing server-side support and management for a multiplayer game), client system 1530 (e.g., a mobile user device such as a mobile phone on which a mobile game application is installed for client-side corporation with the game management system 1700), and network 1560 (e.g., the Internet). The components of system 1500 can be connected to each other in any suitable configuration, using any suitable type of connection. The components may be connected directly or over the network 1560, which may be any suitable network. For example, one or more portions of network 1560 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 1520 (i.e. social network system) is a network-addressable computing system that can host one or more social graphs. Social networking system 1520 can generate, store, receive, and transmit social networking data. Social networking system 1520 can be accessed by the other components of system 1500 either directly or via network 1560.

Game management system 1700 is a network-addressable computing system that can host one or more online games. The game management system 1700 can thus in some embodiments have multiple game engines and multiple game state databases for multiple respective games. Game management system 1700 can generate, store, receive, and transmit game-related data, such as, for example, game account data, game input, game state data, and game displays. Game management system 1700 can be accessed by the other components of system 1500 either directly or via network 1560. Player 1501 may use client system 1530 to access, send data to, and receive data from social networking system 1520 and game management system 1700. Client system 1530 can access social networking system 1520 or game management system 1700 directly, via network 1560, or via a third-party system. As an example and not by way of limitation, client system 1530 may access game management system 1700 via social networking system 1520. Client system 1530 can be any suitable computing device, such as a personal computer, laptop, cellular phone, smart phone, computing tablet, etc.

Although FIG. 15 illustrates a particular number of players 1501, social network systems 1520, game management systems 1700, client systems 1530, and networks 1560, this disclosure contemplates any suitable number of players 1501, social network systems 1520, game management systems 1700, client systems 1530, and networks 1560. As an example and not by way of limitation, system 1500 may include one or more game management systems 1700 and no social networking systems 1520. As another example and not by way of limitation, system 1500 may include a system that comprises both social networking system 1520 and game management system 1700. Moreover, although FIG. 15 illustrates a particular arrangement of social networking system 1520, game management system 1700, client system 1530, and network 1560, this disclosure contemplates any suitable arrangement of player 1501, social networking system 1520, game management system 1700, client system 1530, and network 1560.

The components of system 1500 may be connected to each other using any suitable connections 1510. For example, suitable connections 1510 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 1510 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 1510 need not necessarily be the same throughout system 1500. One or more first connections 1510 may differ in one or more respects from one or more second connections 1510. Although FIG. 15 illustrates particular connections between player 1501, social networking system 1520, game management system 1700, client system 1530, and network 1560, this disclosure contemplates any suitable connections between player 1501, social networking system 1520, game management system 1700, client system 1530, and network 1560. As an example and not by way of limitation, in particular embodiments, client system 1530 may have a direct connection to social networking system 1520 or game management system 1700, bypassing network 1560.

Game Management Systems

In an online computer game, a game engine manages the game state of the game. In the example embodiment of FIG. 15, the game engine may form part of a game server system in the example form of the game management system 1700 (see, e.g. game engine 1710 in FIG. 17). Game state comprises all game play parameters, including player character state, non-player character (NPC) state, in-game object state, game world state (e.g., internal game clocks, game environment), and other game play parameters. Each player 1501 may control one or more player characters (PCs) and/or play a gameboard or slots-type game on a respective player account. The game engine controls all other aspects of the game, including non-player characters (NPCs), and in-game objects. The game engine also manages game state, including player character state for currently active (online) and inactive (offline) players.

An online game is in the illustrated example embodiment hosted by the game management system 1700 (i.e. online gaming system), which in this example embodiment includes an inflation management mechanism 1704 (as illustrated in and described below with reference to FIG. 17) configured to implement the techniques discussed previously with reference to FIGS. 1-14 for automated creation and management of an inflationary economy for virtual currency in the relevant game. The game management system 1700 can be accessed using any suitable connection with a suitable client system 1530. A player may have a game account on game management system 1700, wherein the game account can contain a variety of information associated with the player (e.g., the player's personal information, financial information, purchase history, player character state, game state). In some embodiments, a player may play multiple games on game management system 1700, which may maintain a single game account for the player with respect to all the games, or multiple individual game accounts for each game with respect to the player. In some embodiments, game management system 1700 can assign a unique identifier to each player 1501 of an online game hosted on game management system 1700. Game management system 1700 can determine that a player 1501 is accessing the online game by reading the user's cookies, which may be appended to HTTP requests transmitted by client system 1530, and/or by the player 1501 logging onto the online game.

In particular embodiments, player 1501 may access an online game and control the game's progress via client system 1530 (e.g., by inputting commands to the game at the client device). Client system 1530 displays game interfaces (see, for example, the various game interfaces and notifications described with reference to FIGS. 1-14), receive inputs from player 1501, transmitting user inputs or other events to the game engine, and receive instructions from the game engine. The game engine can be executed on any suitable system (such as, for example, client system 1530, social networking system 1520, or game management system 1700). As an example and not by way of limitation, client system 1530 can download client components of an online game, which are executed locally, while a remote game server, such as game management system 1700, provides backend support for the client components and may be responsible for maintaining application data of the game, processing the inputs from the player, updating and/or synchronizing the game state based on the game logic and each input from the player, and transmitting instructions to client system 1530. Features of one example of the game management system 1700 is further discussed below with reference to FIG. 17. As another example and not by way of limitation, each time player 1501 provides an input to the game through the client system 1530 (such as, for example, by typing on the keyboard or clicking the mouse of client system 1530), the client components of the game may transmit the player's input to game management system 1700.

Storing Game-Related Data

A database may store any data relating to game play within a game management system 1700. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

Game Systems, Social Networks, and Social Graphs

In particular embodiments, player 1501 may access particular game instances of an online game. A game instance is copy of a specific game play area that is created during runtime. In particular embodiments, a game instance is a discrete game play area where one or more players 1501 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 1501 and one or more in-game objects controlled by the game engine. When accessing an online game, the game engine may allow player 1501 to select a particular game instance to play from a plurality of game instances. Alternatively, the game engine may automatically select the game instance that player 1501 will access. In particular embodiments, an online game comprises only one game instance that all players 1501 of the online game can access.

Figure 16:
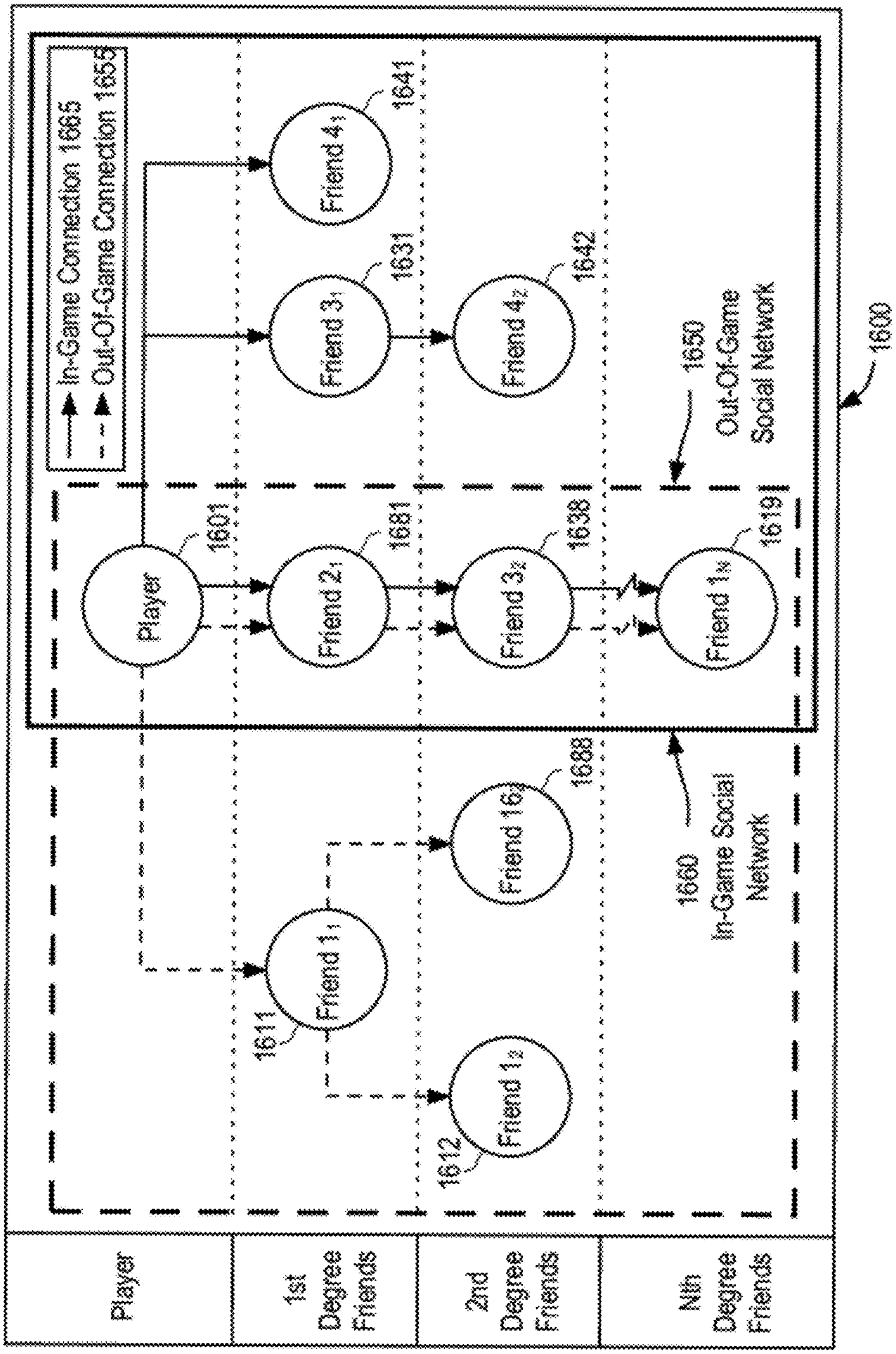
FIG. 16 is a schematic diagram showing an example of a social network within a social graph, according to some embodiments.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may FIG. 16 shows an example of a social network within a social graph. As shown, Player 1601 can be associated, connected or linked to various other users, or "friends," within the social network 1650. These associations, connections or links can track relationships between users within the social network 1650 and are commonly referred to as online "friends" or "friendships" between users. Each friend or friendship in a particular user's social network within a social graph is commonly referred to as a "node." For purposes of illustration and not by way of limitation, the details of social network 1650 will be described in relation to Player 1601. As used herein, the terms "player," "user" and "account" can be used interchangeably and can refer to any user or character in an online game management system or social networking system. As used herein, the term "friend" can mean any node within a player's social network.

As shown in FIG. 16, Player 1601 has direct connections with several friends. When Player 1601 has a direct connection with another individual, that connection is referred to as a first-degree friend. In social network 1650, Player 1601 has two first-degree friends. That is, Player 1601 is directly connected to Friend $1_1$ 1611 and Friend $2_1$ 1621. In a social graph, it is possible for individuals to be connected to other individuals through their first-degree friends (i.e., friends of friends). As described above, each edge required to connect a player to another user is considered the degree of separation. For example, FIG. 16 shows that Player 1601 has three second-degree friends to which he is connected via his connection to his first-degree friends. Second-degree Friend $1_2$ 1612 and Friend $2_2$ 1622 are connected to Player 1601 via his first-degree Friend $1_1$ 1611. The limit on the depth of friend connections, or the number of degrees of separation for associations, that Player 1601 is allowed is typically dictated by the restrictions and policies implemented by social networking system 1520.

In various embodiments, Player 1601 can have Nth-degree friends connected to him through a chain of intermediary degree friends as indicated in FIG. 16. For example, Nth-degree Friend $1_N$ 1619 is connected to Player 1601 via second-degree Friend $3_2$ 1632 and one or more other higher-degree friends. Various embodiments may take advantage of and utilize the distinction between the various degrees of friendship relative to Player 1601.

In particular embodiments, a player (or player character) can have a social graph within an online multiplayer game that is maintained by the game engine and another social graph maintained by a separate social networking system. FIG. 16 depicts an example of in-game social network 1660 and out-of-game social network 1650. In this example, Player 1601 has out-of-game connections 1655 to a plurality of friends, forming out-of-game social network 1650. Here, Friend $1_1$ 1611 and Friend $2_1$ 1621 are first-degree friends with Player 1601 in his out-of-game social network 1650. Player 1601 also has in-game connections 1665 to a plurality of players, forming in-game social network 1660. Here, Friend $2_1$ 1621, Friend $3_1$ 1631, and Friend $4_1$ 1641 are first-degree friends with Player 1601 in his in-game social network 1660. In some embodiments, it is possible for a friend to be in both the out-of-game social network 1650 and the in-game social network 1660. Here, Friend $2_1$ 1621 has both an out-of-game connection 1655 and an in-game connection 1665 with Player 1601, such that Friend $2_1$ 1621 is in both Player 1601's in-game social network 1660 and Player 1601's out-of-game social network 1650.

As with other social networks, Player 1601 can have second-degree and higher-degree friends in both his in-game and out of game social networks. In some embodiments, it is possible for Player 1601 to have a friend connected to him both in his in-game and out-of-game social networks, wherein the friend is at different degrees of separation in each network. For example, if Friend $2_2$ 1622 had a direct in-game connection with Player 1601, Friend $2_2$ 1622 would be a second-degree friend in Player 1601's out-of-game social network, but a first-degree friend in Player 1601's in-game social network. In particular embodiments, a game engine can access in-game social network 1660, out-of-game social network 1650, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

FIG. 17 shows a schematic view of a game management system 1700 that includes a number of hardware-implemented modules or arrangement for performing various automated procedures described with reference to the example embodiments of FIGS. 1-14. The functionalities of the system 1700 and its respective components is briefly summarized immediately below. The various methodologies described herein are to be understood as being performed in this example embodiment by use of the game management system 1700, thereby further to illustrate the configuration of system 1700. Thus, the game interfaces and user interface elements illustrated in FIGS. 1, 3, 5-9 and 11-14 is facilitated by the game management system 1700, and the methods of FIGS. 2, 4, and 10 are performed by the game management system 1700.

As discussed previously, the game management system 1700 may in some embodiments be provided by a user device, such as the mobile phone. In other embodiments, the system 1700 may be provided by server-side components, such as the game server providing the example game management system 1700 of FIG. 15.

The system 1700 includes a game engine 1710 that manages and controls implementation of the game, as previously described. The system 1700 further includes an input interpreter 1720 configured to receive and interpret input in the form of user-selection of a particular one of a plurality of user interface elements or icons forming part of a game interface. The system 1700 further includes an inflation management mechanism 1704 configured to implement the inflationary economy described above with reference to FIGS. 1-14.

The modules 1704-1720 are configured to communicate with each other (e.g., via a bus, shared memory, or a switch). Any one or more of the modules 1710-1720 described herein may be implemented using hardware (e.g., one or more processors of a machine) or a combination of hardware and software. For example, any module described herein may configure a processor (e.g., among one or more processors of a machine) to perform the operations described herein for that module. Thus, the modules may comprise circuitry formed dynamically by dynamic configuration of a reconfigurable processor through the execution of software code on the reconfigurable processor. Instead, or in addition, at least some of the modules may comprise permanently configured circuitry (e.g., an application specific integrated circuit) that is configured to perform the respective automated operations. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Data Flow

Figure 18:
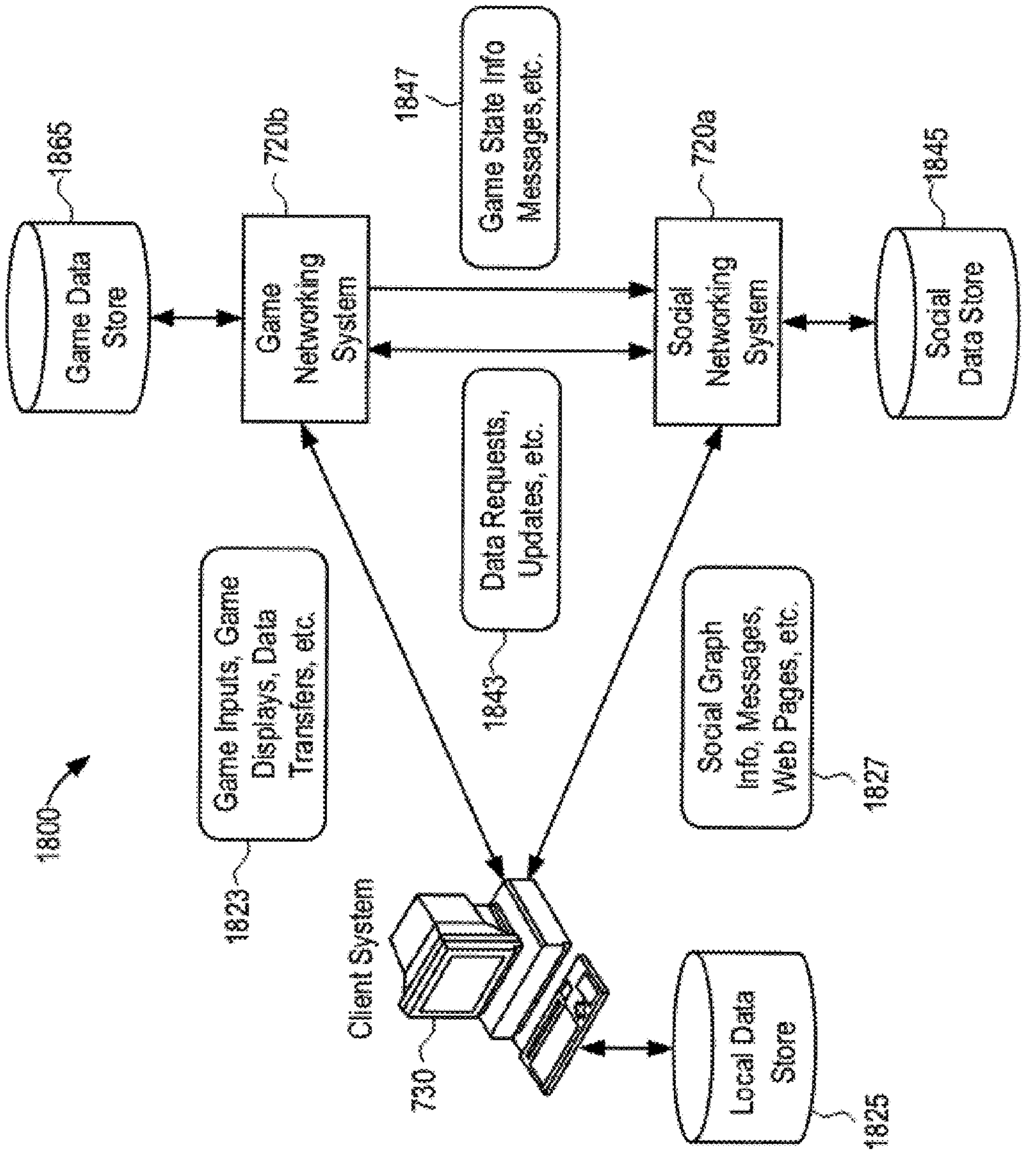
FIG. 18 is a diagrammatic representation of an example data flow between example components of the example system of FIG. 15, according to some example embodiments.

FIG. 18 illustrates an example data flow between the components of system 1800. In particular embodiments, system 1800 can include client system 1530, social networking system 1520 (i.e. social network system), and game management system 1700 (i.e. online game system system). The components of system 1800 can be connected to each other in any suitable configuration, using any suitable type of connection. The components may be connected directly or over any suitable network. Client system 1530, social networking system 1520, and game management system 1700 can each have one or more corresponding data stores such as a local data store, social data store 1845, and game data store 1865, respectively. Social networking system 1520 and game management system 1700 can also have one or more servers that can communicate with client system 1530 over an appropriate network. Social networking system 1520 and game management system 1700 can have, for example, one or more internet servers for communicating with client system 1530 via the Internet. Similarly, social networking system 1520 and game management system 1700 can have one or more mobile servers for communicating with client system 1530 via a mobile network (e.g., GSM, PCS, Wi-Fi, WPAN, etc.). In some embodiments, one server may be able to communicate with client system 1530 over both the Internet and a mobile network. In other embodiments, separate servers can be used.

Client system 1530 can receive and transmit data 1823 to and from game management system 1700. This data can include, for example, webpages, messages, game inputs, game displays, HTTP packets, data requests, transaction information, updates, and other suitable data. At some other time, or at the same time, game management system 1700 can communicate data 1843, 1847 (e.g., game state information, game system account information, page info, messages, data requests, updates, etc.) with other networking systems, such as social networking system 1520 (e.g., Facebook, Myspace, etc.). Client system 1530 can also receive and transmit data 1827 to and from social networking system 1520. This data can include, for example, webpages, messages, social graph information, social network displays, HTTP packets, data requests, transaction information, updates, and other suitable data.

Communication between client system 1530, social networking system 1520, and game management system 1700 can occur over any appropriate electronic communication medium or network using any suitable communications protocols. For example, client system 1530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game management system 1700, the BLOB containing the game state for the instance corresponding to the player can be transmitted to client system 1530 for use by a client-side executed object to process. In particular embodiments, the client-side executable may be a FLASH-based game, which can de-serialize the game state data in the BLOB. As a player plays the game, the game logic implemented at client system 1530 maintains and modifies the various game state parameters locally. The client-side game logic may also batch game events, such as mouse clicks, and transmit these events to game management system 1700. Game management system 1700 may itself operate by retrieving a copy of the BLOB from a database or an intermediate memory cache (memcache) layer. Game management system 1700 can also de-serialize the BLOB to resolve the game state parameters and execute its own game logic based on the events in the batch file of events transmitted by the client to synchronize the game state on the server side. Game management system 1700 may then re-serialize the game state, now modified, into a BLOB and pass this to a memory cache layer for lazy updates to a persistent database.

With a client-server environment in which the online games may run, one server system, such as game management system 1700, may support multiple client systems 1530. At any given time, there may be multiple players at multiple client systems 1530 all playing the same online game. In practice, the number of players playing the same game at the same time may be very large. As the game progresses with each player, multiple players may provide different inputs to the online game at their respective client systems 1530, and multiple client systems 1530 may transmit multiple player inputs and/or game events to game management system 1700 for further processing. In addition, multiple client systems 1530 may transmit other types of application data to game management system 1700.

In particular embodiments, a computed-implemented game may be a text-based or turn-based game implemented as a series of web pages that are generated after a player selects one or more actions to perform. The web pages may be displayed in a browser client executed on client system 1530. As an example and not by way of limitation, a client application downloaded to client system 1530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 1520. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 1530, either caused by an action of a game player or by the game logic itself, client system 1530 may need to inform game management system 1700 of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 1800 is discussed in reference to updating a multi-player online game hosted on a network-addressable system (such as, for example, social networking system 1520 or game management system 1700), where an instance of the online game is executed remotely on a client system 1530, which then transmits application event data to the hosting system such that the remote game server synchronizes game state associated with the instance executed by the client system 1530.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 1530 may include a Flash client. The Flash client may be configured to receive and run Flash application or game object code from any suitable networking system (such as, for example, social networking system 1520 or game management system 1700). In particular embodiments, the Flash client may be run in a browser client executed on client system 1530. A player can interact with Flash objects using client system 1530 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 1530, the Flash client may send the events that caused the game state changes to the in-game object to game management system 1700. However, to expedite the processing and hence the speed of the overall gaming experience, the Flash client may collect a batch of some number of events or updates into a batch file. The number of events or updates may be determined by the Flash client dynamically or determined by game management system 1700 based on server loads or other factors. For example, client system 1530 may send a batch file to game management system 1700 whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 1530. In particular embodiments, the batch file may be a text file and the name-value pairs may be in string format.

In particular embodiments, when a player plays an online game on client system 1530, game management system 1700 may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game management system 1700 may retrieve the corresponding BLOB from the database to determine the most-recent values of the game-related data. In particular embodiments, while a player is playing the online game, game management system 1700 may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 19:
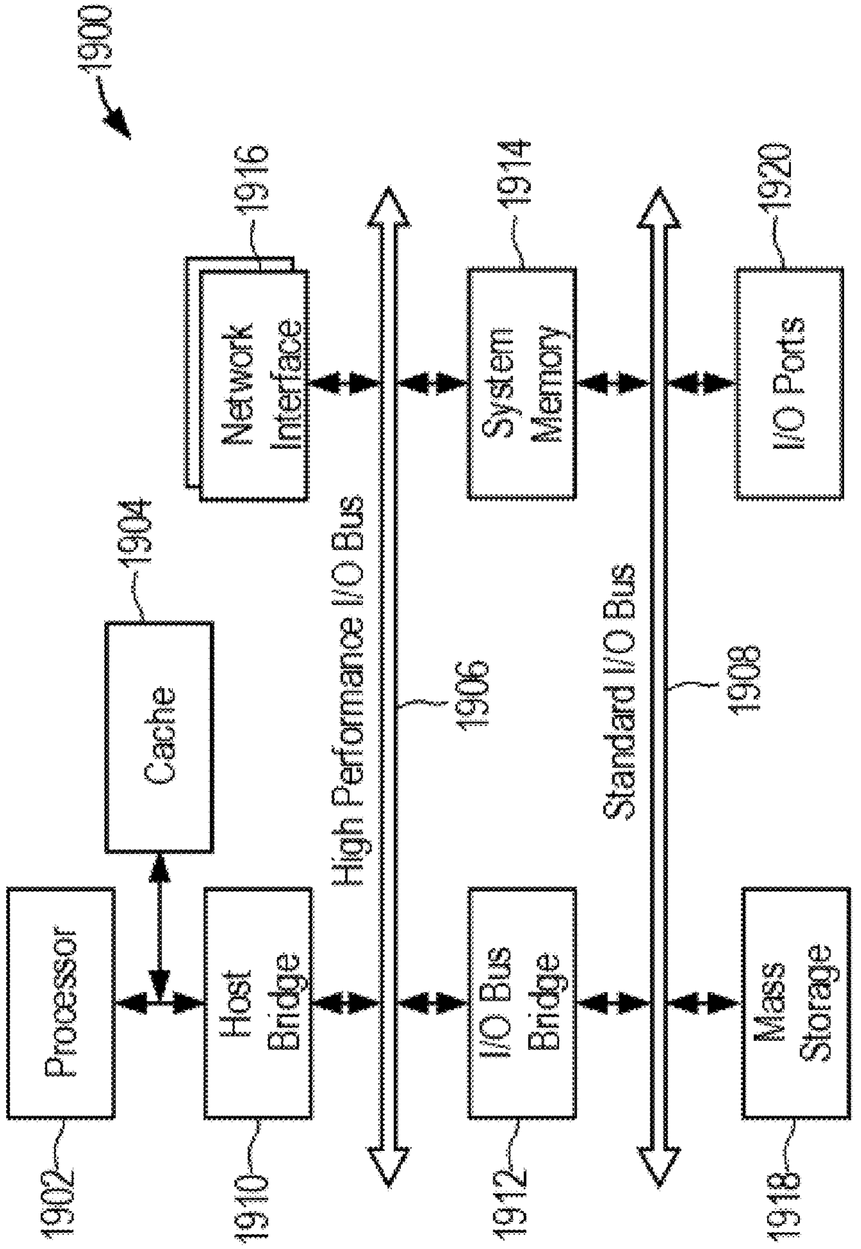
FIG. 19 illustrates an example computing system architecture, which may be used to implement a server or a client system illustrated in FIG. 20, according to some example embodiments.
Figure 20:
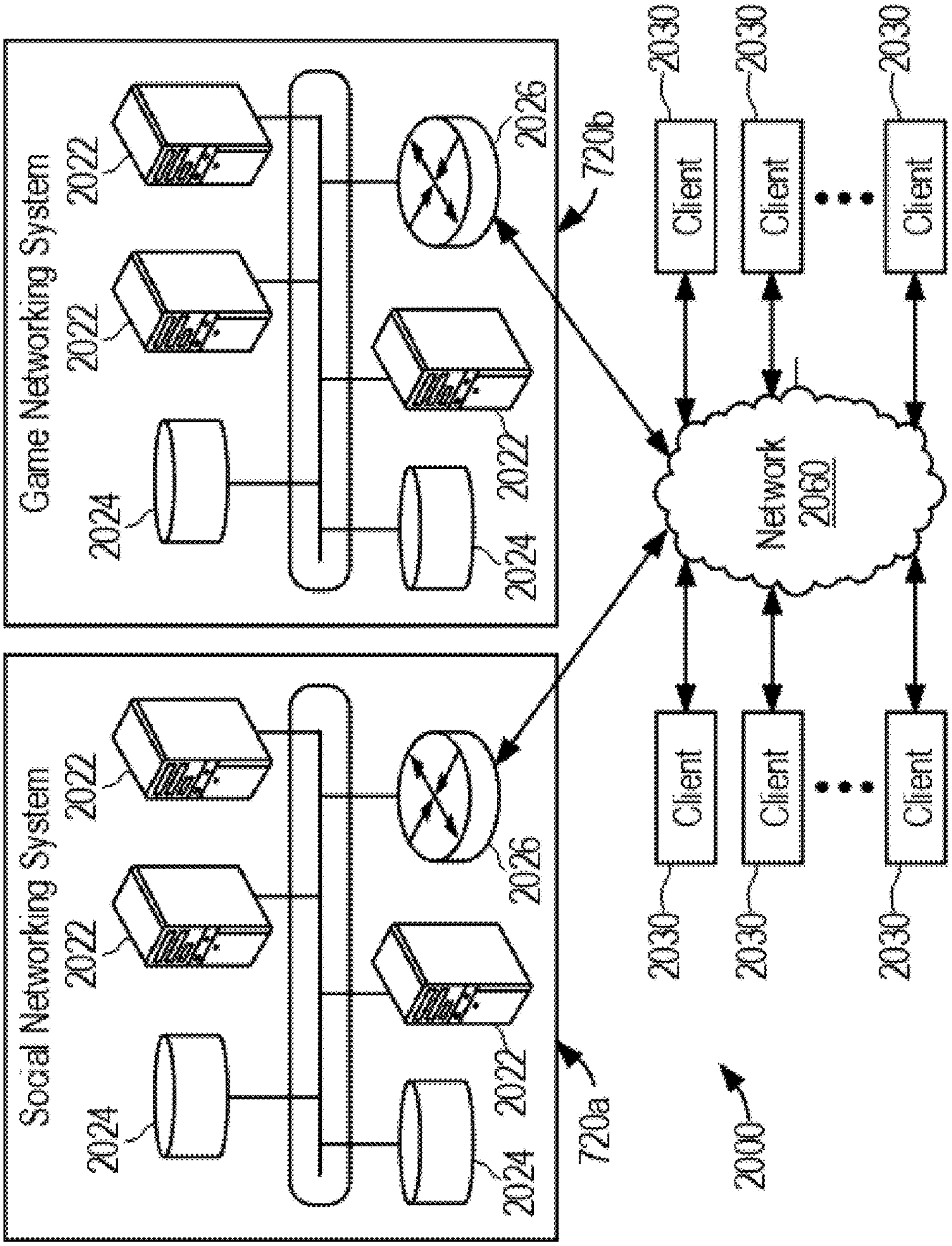
FIG. 20 illustrates an example network environment, in which various example embodiments may operate.

FIG. 19 illustrates an example computing system architecture, which may be used to implement a server 2022 or a client system 1530 illustrated in FIG. 20. In one embodiment, hardware system 1900 comprises a processor 1902, a cache memory 1904, and one or more executable modules and drivers, stored on a tangible computer readable medium, directed to the functions described herein. Additionally, hardware system 1900 may include a high performance input/output (I/O) bus 1906 and a standard I/O bus 1908. A host bridge 1910 may couple processor 1902 to high performance I/O bus 1906, whereas I/O bus bridge 1912 couples the two buses 1906 and 1908 to each other. A system memory 1914 and one or more network/communication interfaces 1916 may couple to bus 1906. Hardware system 1900 may further include video memory (not shown) and a display device coupled to the video memory. Mass storage 1918 and I/O ports 1920 may couple to bus 1908. Hardware system 1900 may optionally include a keyboard, a pointing device, and a display device (not shown) coupled to bus 1908. Collectively, these elements are intended to represent a broad category of computer hardware systems, including but not limited to general purpose computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

The elements of hardware system 1900 are described in greater detail below. In particular, network interface 1916 provides communication between hardware system 1900 and any of a wide range of networks, such as an Ethernet (e.g., IEEE) network, a backplane, etc. Mass storage 1918 provides permanent storage for the data and programming instructions to perform the above-described functions implemented in servers 2022, whereas system memory 1914 (e.g., DRAM) provides temporary storage for the data and programming instructions when executed by processor 1902. I/O ports 1920 are one or more serial and/or parallel communication ports that provide communication between additional peripheral devices, which may be coupled to hardware system 1900.

Hardware system 1900 may include a variety of system architectures and various components of hardware system 1900 may be rearranged. For example, cache 1904 may be on-chip with processor 1902. Alternatively, cache 1904 and processor 1902 may be packed together as a "processor module," with processor 1902 being referred to as the "processor core." Furthermore, certain embodiments of the present disclosure may not require nor include all of the above components. For example, the peripheral devices shown coupled to standard I/O bus 1908 may couple to high performance I/O bus 1906. In addition, in some embodiments, only a single bus may exist, with the components of hardware system 1900 being coupled to the single bus. Furthermore, hardware system 1900 may include additional components, such as additional processors, storage devices, or memories.

An operating system manages and controls the operation of hardware system 1900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 20 illustrates an example network environment, in which various example embodiments may operate. Network cloud 2060 generally represents one or more interconnected networks, over which the systems and hosts described herein can communicate. Network cloud 2060 may include packet-based wide area networks (such as the Internet), private networks, wireless networks, satellite networks, cellular networks, paging networks, and the like. As FIG. 20 illustrates, particular embodiments may operate in a network environment comprising one or more networking systems, such as social networking system 1520, game management system 1700, and one or more client systems 1530. The components of social networking system 1520 and game management system 1700 operate analogously; as such, hereinafter they may be referred to simply at networking system 1520. Client systems 1530 are operably connected to the network environment via a network service provider, a wireless carrier, or any other suitable means.

Networking system 1520 is a network addressable system that, in various example embodiments, comprises one or more physical servers 2022 and data stores 2024. The one or more physical servers 2022 are operably connected to computer network 2060 via, by way of example, a set of routers and/or networking switches 2026. In an example embodiment, the functionality hosted by the one or more physical servers 2022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 2022 may host functionality directed to the operations of networking system 1520. Hereinafter servers 2022 may be referred to as server 2022, although server 2022 may include numerous servers hosting, for example, networking system 1520, as well as other content distribution servers, data stores, and databases. Data store 2024 may store content and data relating to, and enabling, operation of networking system 1520 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2024 corresponds to one or more of a variety of separate and integrated databases, such as relational databases and object-oriented databases, that maintain information as an integrated collection of logically related records or files stored on one or more physical systems. Structurally, data store 2024 may generally include one or more of a large class of data storage and management systems. In particular embodiments, data store 2024 may be implemented by any suitable physical system(s) including components, such as one or more database servers, mass storage media, media library systems, storage area networks, data storage clouds, and the like. In one example embodiment, data store 2024 includes one or more servers, databases (e.g., MySQL), and/or data warehouses. Data store 2024 may include data associated with different networking system 1520 users and/or client systems 1530.

Client system 1530 is generally a computer or computing device including functionality for communicating (e.g., remotely) over a computer network. Client system 1530 may be a desktop computer, laptop computer, personal digital assistant (PDA), in- or out-of-car navigation system, smart phone or other cellular or mobile phone, or mobile gaming device, among other suitable computing devices. Client system 1530 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1530 to enter addresses of specific network resources to be retrieved, such as resources hosted by networking system 1520. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1530 desires to view a particular webpage (hereinafter also referred to as target structured document) hosted by networking system 1520, the user's web browser, or other document Sequence Generator or suitable client application, formulates and transmits a request to networking system 1520. The request generally includes a URL or other document identifier as well as metadata or other information. By way of example, the request may include information identifying the user, such as a user ID, as well as information identifying or characterizing the web browser or operating system running on the user's client computing device 1530. The request may also include location information identifying a geographic location of the user's client system or a logical network location of the user's client system. The request may also include a timestamp identifying when the request was transmitted.

Although the example network environment described above and illustrated in FIG. 20 described with respect to social networking system 1520 and game management system 1700, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Although the above example embodiments described as being implemented via a web browser on a client device, it is to be noted that a game display may in some embodiments be provided by a virtual reality (VR) display or an augmented reality (AR) display. AR comprises a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. An augmented reality gaming device may allow players to interact with visual elements thus overlaid on the view of reality. Augmentation may be performed in real-time and may comprise overlaying on the view of reality one or more user interface elements that can be selected a manipulated by the user, and may further comprise overlaying on the view of reality game objects and/or character with which the player can interact during gameplay.

Virtual Reality (VR), which can be referred to as immersive multimedia or computer-simulated life, replicates an environment that simulates physical presence in places in the real world or imagined worlds and lets the user interact in that world. Virtual reality artificially creates sensory experiences, which can include sight, hearing, touch, smell, taste, and more. Virtual reality environments can be displayed either on a computer screen or with special stereoscopic displays, and some simulations include additional sensory information and focus on real sound through speakers or headphones targeted towards VR users. Some advanced, haptic, systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The simulated gaming environment displayed to the user by use of a virtual reality gaming device can for some games be similar to the real world in order to create a lifelike experience, while the virtual gaming environment seemingly inhabited by the player during VR gameplay may in other embodiments be stylized environments that differ significantly from reality The above-disclosed and described techniques for managing an in-game virtual economy such that it employs an inflationary system with respect to a number of related and cooperating inflationary features of the game provides for benefits over existing methods for the administration of such multiplayer online games. For example, in existing slot game apps comparable to the example embodiment described with reference to FIGS. 1-14, buy page coin amounts and qualifying bets increase when players level up, while maintaining a consistent virtual currency value (e.g., virtual coin amounts) for game features. Thus, for example, jackpot pool amounts do not increase with level ups but is instead presented at consistent virtual coin amounts to players at all different game levels.

Accordingly, such games deploy game features with multiple tiers of benefits. Higher tiers can, e.g., only be unlocked with higher bets unlocked at higher level. With such a structure, some community features cannot be shared among all players as a group. For example, jackpot pools are necessarily split into several smaller pools, one for each tier.

In contrast, the disclosed inflationary economy allows for the use of a single jackpot pool which is playable by everyone, regardless of game level, displaying different jackpot amounts to players at different levels. Due to the resultant expansion of players eligible for community features, vastly greater player pools are typically involved in the community features, boosting player interest and thus player retention. Further, the use of a single inflation factor or each inflation tier provides for an elegant and readily deployable game mechanism.

From the preceding description it will be seen that a number of example embodiments and combinations of example embodiments are disclosed. The disclosed embodiments include, but are not limited to, the enumerated list of example embodiments that follow:

Example 1: A method comprising:

at a server system, hosting a computer-implemented online game in which players, during gameplay, incur expenses and receive rewards whose respective in-game values are, in a game interface displayed to a user for playing the game, denominated in an in-game virtual currency, the game defining multiple game levels through which players can progress during extended gameplay; and responsive to a player achieving a particular level increase, in which the player progresses from a lower game level to a higher game level, automatically inflating a virtual currency value of one or more features of the game, the one or more features each having identical gameplay functionality in the lower game level and in the higher game level, but each of the one or more features having a greater virtual currency value in the higher game level than in the lower game level.

Example 2: The method of example 1, wherein the inflating of the virtual currency value of the one or more features comprises, for each of a plurality of game levels of the game:

defining at least one inflation factor applicable to the one or more features, the inflation factor for a particular feature increasing progressively in size with an increase in game level; and for each of the one or more features at the respective game level, calculating a respective virtual currency value for the feature based at least in part on the corresponding inflation factor combined with a reference value for the respective feature.

Example 3: The method of example 2, further comprising:

hosting a communal competitive event, in which a plurality of players at different respective game levels compete for a common reward;

displaying via respective game interfaces on respective user devices associated with the plurality of players different virtual currency values for the common reward based on respectively corresponding inflation factors, so that a first player at a first game level competes for a lower virtual currency value for the common reward than a second player at a second game level higher than the first game level; and responsive to a particular player winning the communal competitive event, providing to the winning player the common reward at the displayed virtual currency value corresponding to the game level of the winning player.

Example 4 The method of example 3, wherein gameplay mechanics of the communal competitive event provides for a minimum expenditure for any player to participate in the communal competitive event, the method further comprising:

for each of the plurality of game levels, defining a respective virtual currency value for the minimum expenditure based at least in part on the corresponding inflation factor, so that the virtual currency value for the minimum expenditure progressively increases in size with an increase in game level.

Example 5: The method of example 4, wherein, at each of the plurality of game levels, a common inflation factor applies to the common reward and to the minimum expenditure, so that a ratio between the common reward and the minimum expenditure is consistent across the plurality of game levels.

Example 6: The method of example 4 or example 5, wherein the communal competitive event is a game of chance;

wherein the common reward is a common jackpot that varies in virtual currency value with variance in game level; and wherein the minimum expenditure for each of the plurality of game levels is a respective minimum wager amount that varies in virtual currency value with variance in game level.

Example 7: The method of example 6, further comprising:

receiving from each player competing for the common jackpot a respective wager denominated in the corresponding game interface in the virtual currency;

calculating for each competing player a respective reference value for their wager based at least in part on the corresponding inflation factor at the respective game level;

calculating for each competing player a respective winning probability based on the corresponding reference value, so that two players at different respective game levels who expend different respective wager amounts with identical reference value are calculated as having an identical winning probability; and executing the game of chance for the competing players based on their respective calculated winning probabilities.

Example 8: The method of any one of examples 2-7, wherein the respective inflation factors for the plurality of game levels are defined such that a rate of inflation for a particular feature is greater at initial game levels, the rate of inflation progressively flattening with an increase in game level.

Example 9: The method of any one of examples 2-8 wherein the reference value for each of the one or more features is a virtual currency value of the respective feature in an initial game level.

Example 10: The method of any one of examples 2-8 wherein the reference value for each of the one or more features is a real value of the respective feature at a different game level, the real value being provided by the virtual currency value of the feature at said different game level divided by a conversion rate between a real-world currency and the virtual currency at said different game level.

Example 11: The method of any one of examples 2-10, wherein, for each of the plurality of game levels, a respective universal inflation factor is applied to the one or more features in common.

Example 12: The method of example 11, wherein, for each of the plurality of game levels, the universal inflation factor provides a conversion rate defining a purchase cost in real-world currency for acquiring virtual currency in the respective game level.

Example 13: The method of any one of examples 1-12, in which the one or more features include a virtual currency award for an in-game achievement.

Example 14: The method of example 13, wherein gameplay includes performing a wager, the virtual currency award being winnings in virtual currency received by the player for a successful outcome of the wager.

Example 15: The method of any one of examples 1-14, in which the one or more features include a cost expended by the player to acquire an in-game asset or to participate in an in-game action.

Example 16: The method of example 15, wherein gameplay includes performance of wagers in a game of chance, the one or more features including a minimum wager amount to be expended by the player to qualify for the game of chance, so that the minimum wager amount has a greater virtual currency value in the higher game level than in the lower game level.

Example 17: The method of any one of examples 1-16, wherein the multiple game levels are respective experience levels earned by a player, with gameplay mechanics remaining substantially constant across different experience levels.

Example 18: The method of example 17, wherein the inflating of the virtual currency values of the one or more features are performed for a predefined subset of the multiple game levels.

Example 19: A system comprising:

one or more computer processor devices; and memory storing instructions to configure the one or more computer processor devices, when executing the one or more instructions, to perform operations comprising the method of any one of examples 1-18.

Example 20: A computer readable storage medium having stored thereon instructions for causing a machine, when executing the instructions, to perform operations comprising the method of any one of examples 1-18.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:

at a server system, hosting a computer-implemented online game in which players, during gameplay, incur expenses and receive rewards whose respective in-game values are, in a game interface displayed to a user for playing the online game, denominated in an in-game virtual currency, the online game defining multiple game levels through which players can progress during extended gameplay; and responsive to a player achieving a particular level increase in which the player progresses from a first game level to a second game level, automatically performing a value adjustment operation that comprises modifying a virtual currency value of one or more features of the online game from the perspective of the player, such that each of the one or more features has different respective virtual currency values in the first and second game levels respectively, gameplay functionality of the one or more features being consistent between the first and second game levels.

2. The method of claim 1, wherein the value adjustment operation comprises increasing the virtual currency value of the one or more game features responsive to any increase in the game level.

3. The method of claim 1, wherein the value adjustment operation comprises, for each of the one or more features which has both an expense cost and a reward value, increasing the expense cost and the reward value by a common factor.

4. The method of claim 2, wherein the value adjustment operation comprises applying a common inflation factor equally to the respective values of each of the one or more features.

5. The method of claim 1, wherein the value adjustment operation for the one or more features comprises, for each of a plurality of game levels of the online game:

defining at least one inflation factor applicable to the one or more features, the inflation factor for a particular feature increasing progressively in size with an increase in game level; and for each of the one or more features at the respective game level, calculating a respective virtual currency value for the feature based at least in part on the corresponding inflation factor combined with a reference value for the respective feature.

6. The method of claim 5, further comprising:

hosting a communal competitive event, in which a plurality of players at different respective game levels compete for a common reward;

displaying via respective game interfaces on respective user devices associated with the plurality of players different virtual currency values for the common reward based on respectively corresponding inflation factors, so that a first player at a first game level competes for a lower virtual currency value for the common reward than a second player at a second game level higher than the first game level; and responsive to a particular player winning the communal competitive event, providing to the winning player the common reward at the displayed virtual currency value corresponding to the online game level of the winning player.

7. The method of claim 6, wherein gameplay mechanics of the communal competitive event provides for a minimum expenditure for any player to participate in the communal competitive event, the method further comprising:

for each of the plurality of game levels, defining a respective virtual currency value for the minimum expenditure based at least in part on the corresponding inflation factor, so that the virtual currency value for the minimum expenditure progressively increases in size with an increase in game level.

8. The method of claim 7, wherein, at each of the plurality of game levels, a common inflation factor applies to the common reward and to the minimum expenditure, so that a ratio between the common reward and the minimum expenditure is consistent across the plurality of game levels.

9. The method of claim 7, wherein the communal competitive event is a game of chance, wherein the common reward is a common jackpot that varies in virtual currency value with variance in game level, and wherein the minimum expenditure for each of the plurality of game levels is a respective minimum wager amount that varies in virtual currency value with variance in game level.

10. The method of claim 9, further comprising:

receiving from each player competing for the common jackpot a respective wager denominated in the corresponding game interface in the virtual currency;

calculating for each competing player a respective reference value for their wager based at least in part on the corresponding inflation factor at the respective game level;

calculating for each competing player a respective winning probability based on the corresponding reference value, so that two players at different respective game levels who expend different respective wager amounts with identical reference value are calculated as having an identical winning probability; and executing the online game of chance for the competing players based on their respective calculated winning probabilities.

11. The method of claim 5, wherein the respective inflation factors for the plurality of game levels are defined such that a rate of inflation for a particular feature is greater at initial game levels, the rate of inflation progressively flattening with an increase in game level.

12. The method of claim 5, wherein the reference value for each of the one or more features is a real value of the respective feature at a different game level, the real value being provided by the virtual currency value of the feature at said different game level divided by a conversion rate between a real-world currency and the virtual currency at said different game level.

13. The method of claim 5, wherein, for each of the plurality of game levels, a respective universal inflation factor is applied to the one or more features in common, and wherein, for each of the plurality of game levels, the universal inflation factor provides a conversion rate defining a purchase cost in real-world currency for acquiring virtual currency in the respective game level.

14. The method of claim 1, in which the one or more features include a virtual currency award for an in-game achievement.

15. The method of claim 14, wherein gameplay includes performing a wager, the virtual currency award being winnings in virtual currency received by the player for a successful outcome of the wager.

16. The method of claim 1, in which the one or more features include a cost expended by the player to acquire an in-game asset or to participate in an in-game action.

17. The method of claim 16, wherein gameplay includes performance of wagers in a game of chance, the one or more features including a minimum wager amount to be expended by the player to qualify for the online game of chance, so that the minimum wager amount has a greater virtual currency value in the second game level than in the first game level.

18. The method of claim 5, wherein the inflating of the virtual currency values of the one or more features are performed for a predefined subset of the multiple game levels.

19. A system comprising:

one or more computer processor devices; and memory storing non-transitory machine readable instructions that, when executed by the one or more computer processor devices, configure the system to perform operations comprising:

at a server system, hosting a computer-implemented online game in which players, during gameplay, incur expenses and receive rewards whose respective in-game values are, in a game interface displayed to a user for playing the online game, denominated in an in-game virtual currency, the online game defining multiple game levels through which players can progress during extended gameplay; and responsive to a player achieving a particular level increase in which the player progresses from a first game level to a second game level, automatically performing a value adjustment operation that comprises modifying a virtual currency value of one or more features of the online game from the perspective of the player, such that each of the one or more features has different respective virtual currency values in the first and second game levels respectively, gameplay functionality of the one or more features being consistent between the first and second game levels.

20. A non-transitory computer-readable storage medium, the computer-readable storage medium including instructions that when executed by a computer, cause the computer to perform operations comprising:

at a server system, hosting a computer-implemented online game in which players, during gameplay, incur expenses and receive rewards whose respective in-game values are, in a game interface displayed to a user for playing the online game, denominated in an in-game virtual currency, the online game defining multiple game levels through which players can progress during extended gameplay; and responsive to a player achieving a particular level increase in which the player progresses from a first game level to a second game level, automatically performing a value adjustment operation that comprises modifying a virtual currency value of one or more features of the online game from the perspective of the player, such that each of the one or more features has different respective virtual currency values in the first and second game levels respectively, gameplay functionality of the one or more features being consistent between the first and second game levels.

* * * * *